United States Patent
Endler et al.

(10) Patent No.: US 11,558,409 B2
(45) Date of Patent: *Jan. 17, 2023

(54) DETECTING USE OF PASSWORDS THAT APPEAR IN A REPOSITORY OF BREACHED CREDENTIALS

(71) Applicant: SpyCloud, Inc., Austin, TX (US)

(72) Inventors: David Endler, Austin, TX (US); Alen Puzic, Austin, TX (US); Edward Ross, Austin, TX (US)

(73) Assignee: SpyCloud, Inc., Austin, TX (US)

( * ) Notice: Subject to any disclaimer, the term of this patent is extended or adjusted under 35 U.S.C. 154(b) by 509 days.

This patent is subject to a terminal disclaimer.

(21) Appl. No.: 16/667,522

(22) Filed: Oct. 29, 2019

(65) Prior Publication Data

US 2020/0137096 A1    Apr. 30, 2020

Related U.S. Application Data

(60) Provisional application No. 62/753,793, filed on Oct. 31, 2018.

(51) Int. Cl.
*H04L 9/40*    (2022.01)

(52) U.S. Cl.
CPC ...... *H04L 63/1425* (2013.01); *H04L 63/0846* (2013.01); *H04L 63/101* (2013.01); *H04L 63/1433* (2013.01); *H04L 63/1466* (2013.01)

(58) Field of Classification Search
None
See application file for complete search history.

(56) References Cited

U.S. PATENT DOCUMENTS

| | | | | |
|---|---|---|---|---|
| 9,536,067 | B1 * | 1/2017 | Lee | G06F 21/31 |
| 9,569,610 | B2 * | 2/2017 | Arning | G06F 21/36 |
| 9,984,228 | B2 * | 5/2018 | Childress | G06F 3/0237 |
| 10,051,001 | B1 * | 8/2018 | Ashley | H04L 63/1433 |
| 2011/0083181 | A1 * | 4/2011 | Nazarov | H04L 63/14 |
| | | | | 726/23 |
| 2011/0126273 | A1 | 5/2011 | Bhatia et al. | |

(Continued)

FOREIGN PATENT DOCUMENTS

WO    WO-2015076835 A1 *  5/2015    ............. G06F 21/45

OTHER PUBLICATIONS

Internet archive of https://haveibeenpwned.com/ captured Oct. 30, 2018.

(Continued)

*Primary Examiner* — Arezoo Sherkat
(74) *Attorney, Agent, or Firm* — Pillsbury Winthrop Shaw Pittman, LLP

(57) ABSTRACT

Provided is a process that includes: obtaining with a distributed application comprising an identity management system, a first password; comparing with the distributed application, the first password to a set of compromised credentials within a database external to the network-accessible resource; receiving one or more passwords that match the first password based on the comparison; determining with the distributed application whether the one or more passwords satisfy a criterion; and in response to the determination that the one or more passwords satisfy the criterion, causing the first user associated with a first account and the first password to be notified that the first password has been compromised.

36 Claims, 14 Drawing Sheets

(56) References Cited

U.S. PATENT DOCUMENTS

| | | | |
|---|---|---|---|
| 2013/0191630 A1 | 7/2013 | Ylonen et al. | |
| 2013/0191631 A1 | 7/2013 | Ylonen et al. | |
| 2014/0143401 A1 | 5/2014 | Carlen et al. | |
| 2016/0057166 A1 | 2/2016 | Chesla | |
| 2017/0070527 A1* | 3/2017 | Bailey | H04L 67/02 |
| 2017/0304707 A1 | 10/2017 | Morton et al. | |
| 2017/0346797 A1* | 11/2017 | Yedidi | H04L 63/14 |
| 2018/0046796 A1* | 2/2018 | Wright | G06F 21/45 |
| 2018/0068124 A1 | 3/2018 | Medvedev | |
| 2018/0166399 A1 | 6/2018 | Tehranipoor et al. | |
| 2018/0191678 A1 | 7/2018 | Polcha et al. | |
| 2018/0359244 A1* | 12/2018 | Cockerill | H04L 63/0823 |
| 2019/0028557 A1 | 1/2019 | Modi et al. | |
| 2019/0083876 A1 | 3/2019 | Morton et al. | |
| 2019/0372932 A1 | 12/2019 | Polcha et al. | |
| 2020/0026847 A1* | 1/2020 | Botti | G06F 21/604 |
| 2020/0137076 A1* | 4/2020 | Mehta | H04L 63/102 |

OTHER PUBLICATIONS

Internet archive of https://breachalarm.com/ captured Oct. 29, 2018.
Internet archive of https://en.wikipedia.org/wiki/Agloe,_New_York captured Oct. 17, 2018.
Hatmaker, Taylor, "Credit Karma expands its identity theft monitoring tool to include dark web data," https://techcrunch.com/2018/04/24/credit-karma-dark-web-id-monitoring/ Apr. 24, 2018.
Internet archive of https://en.wikipedia.org/wiki/Password_policy captured Jan. 21, 2019.
Internet archive of https://haveibeenpwned.com/ captured Mar. 10, 2019.
U.S. Appl. No. 16/667,367 titled "Detecting Use of Compromised Security Credentials in Private Enterprise Networks" filed Oct. 29, 2019.
U.S. Appl. No. 16/667,447 titled "Filtering Passwords Based on a Plurality of Criteria" filed Oct. 29, 2019.
U.S. Appl. No. 16/667,486 titled "Determining the Intersection of a Set of Compromised Credentials with a Set of Active Credentials with Data Structures and Architectures that Expedite Comparison" filed Oct. 29, 2019.
U.S. Appl. No. 16/776,877 tilted "Generating and Monitoring Fictitious Data Entries to Detect Breaches" filed Jan. 30, 2020.
U.S. Appl. No. 16/777,005 titled "Measuring Data-Breach Propensity" filed Jan. 30, 2020.
David Endler, U.S. Appl. No. 16/667,367, filed Oct. 29, 2019, Detecting Use of Compromised Security Credentials in Private Enterprise Networks.
David Endler, U.S. Appl. No. 16/667,447, filed Oct. 29, 2019, Filtering Passwords Based on a Plurality of Criteria.
David Endler, U.S. Appl. No. 16/667,486, filed Oct. 29, 2019, Determining the Intersection of a Set of Compromised Credentials with a Set of Active Credentials with Data Structures and Architectures that Expedite Comparisons.
David Endler, U.S. Appl. No. 16/776,877, filed Jan. 30, 2020, Generating and Monitoring Fictitious Data Entries to Detect Breaches.
David Endler, U.S. Appl. No. 16/777,005, filed Jan. 30, 2020, Measuring Data-Breach Propensity.

\* cited by examiner

DETECTING USE OF PASSWORDS THAT APPEAR IN A REPOSITORY OF BREACHED CREDENTIALS

CROSS-REFERENCE TO RELATED APPLICATIONS

This application claims benefit of U.S. Provisional Patent Application 62/753,793, titled "Detecting Use of Passwords that Appear in a Repository of Breached Credentials," filed 31 Oct. 2018. The entire content of each aforementioned patent filing is hereby incorporated by reference.

BACKGROUND

1. Field

The present disclosure relates generally to cybersecurity and, more specifically, to detecting use of compromised security credentials to access identity-related services.

2. Description of the Related Art

Computer-security professionals are losing the battle to prevent use of stolen or otherwise exposed security credentials, such as passwords, by which users are authenticated by computer networks. In part, this is due to poor, prevalent password hygiene. People tend to reuse passwords or use low-entropy variations. And these passwords (a term used generically herein to refer to knowledge-factor and biometric security credentials), along with associated user identification, can be easily exposed or stolen, which can help threat actors access various sensitive accounts related to a user. A report by Verizon™ in 2017 indicated that 81% of hacking-related breaches leveraged either stolen or weak passwords and in July 2017 Forrester™ estimated that account takeovers would cause at least $6.5 billion to $7 billion in annual financial losses across industries. Other attack vectors include brute force attacks. Modern GPU's and data structures like rainbow tables facilitate password cracking at rates that were not contemplated when many security practices were engineered. Malicious actors can sell resulting tested credentials on the dark web, making it relatively easy to monetize user credentials and incentivizing even more password cracking. Various malicious buyers of this information may use password and user identification combinations in order to breach and retrieve highly confidential information.

To impede these attacks, online services like "Have I Been Pwned" have arisen. Such systems maintain a database of breached credentials and expose an interface by which the records may be interrogated by users seeking to determine if their credentials have been compromised. Such systems, however, are often too rarely accessed, particularly in the context of enterprise networks, where highly valuable information can be exfiltrated relatively quickly after credentials are compromised. And responses to detected threats are often not fully implemented, as propagating appropriate changes throughout an enterprise network can be relatively high-latency and complex.

SUMMARY

Accordingly, there is a need to be able to efficiently and proactively retrieve exposed or stolen passwords, to block access to a user account associated with a compromised password, to reject use of passwords that have found to have been exposed or compromised, and to notify a user to change a password that has been found to have been exposed or compromised.

The following is a non-exhaustive listing of some aspects of the present techniques. These and other aspects are described in the following disclosure.

Some aspects include a process, including: obtaining, with one or more processors, by an identity management system, with an identity management system, a first password, the first password being associated with a first username of a first user and serving to afford access to a network-accessible resource, wherein the identity management system is a distributed application configured to provide a single-sign-on service via a password management application of the distributed application, and wherein the password management application is installed on a user computing device and provides the single-sign-on service by which a plurality of different network-accessible resources are accessible by presentation of a plurality of different authentication credentials that are associated with the first user and that correspond to the plurality of different network-accessible resources; comparing, with one or more processors, with the distributed application, the first password to a set of compromised credentials within a database external to the network-accessible resource; receiving, with one or more processors, one or more passwords that match the first password based on the comparison; determining, with one or more processors, with the distributed application whether the one or more passwords satisfy a criterion; and in response to the determination that the one or more passwords satisfy the criterion, causing, with one or more processors, the first user associated with a first account and the first password to be notified that the first password has been compromised.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
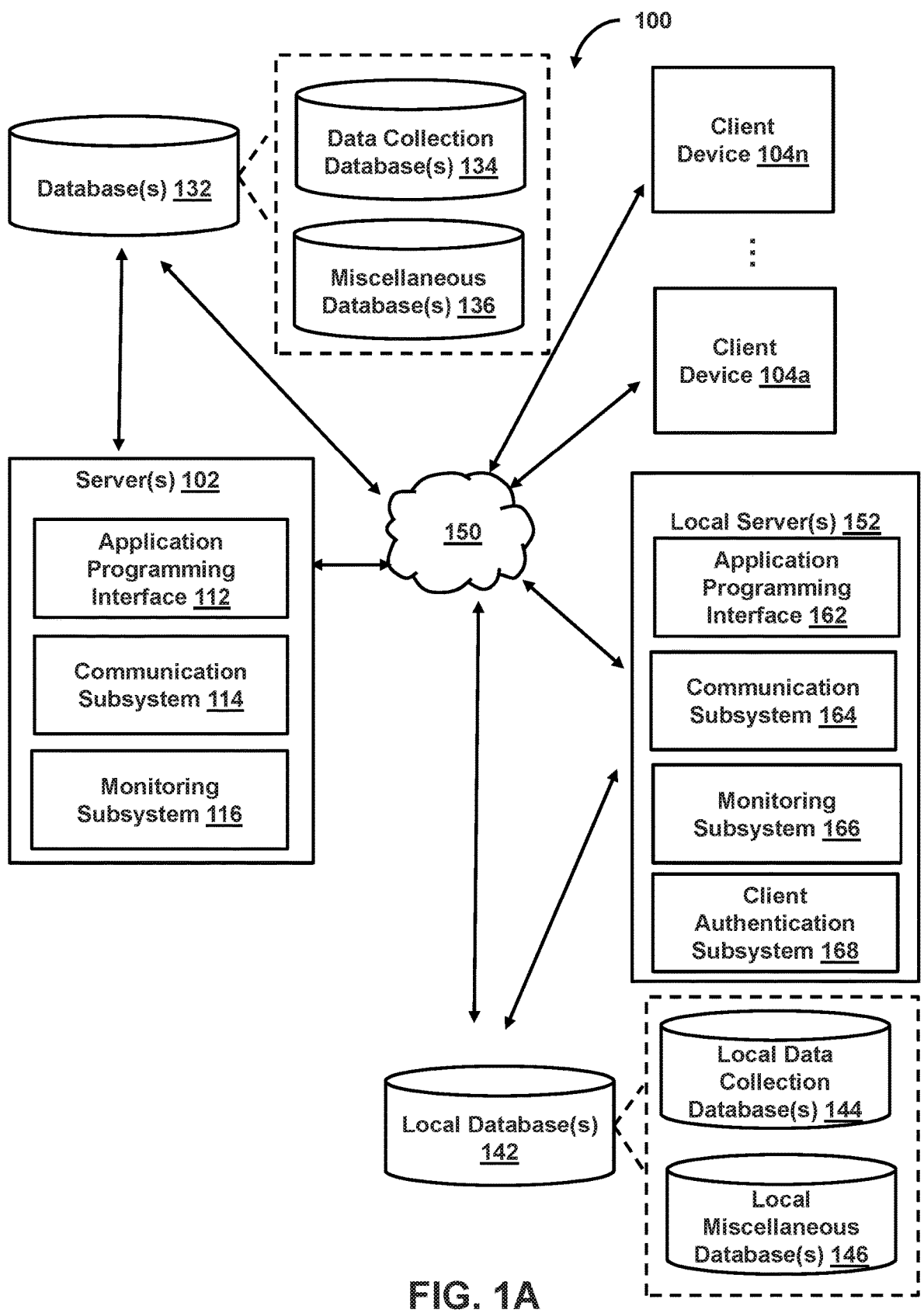
FIG. 1A is a logical and physical architecture block diagram showing an example system for aggregating compromised user credentials and notifying users that their credentials are compromised.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of cybersecurity. Indeed, the inventors wish to emphasize the difficulty of recognizing those problems that are nascent and will become much more apparent in the future should trends in industry continue as the inventors expect. Further, it should be understood that some embodiments are problem-specific, and not all embodiments address every problem with traditional systems described herein or provide every benefit described herein. That said, improvements that solve various permutations of these problems are described below. Some aspects of the present techniques are described below under different headings in all-caps. These techniques may be used together or independently (along with the description above), which is not to suggest that other descriptions are limiting.

Some embodiments mitigate some of the above-described issues (or other problems described below or that will be self-evident to those in the field) by integrating a repository of compromised credentials with an identity management system, such as a password manager. By integrating the repository of compromised credentials with a password manager, the password manager may be able to compare a user credential with a set of compromised credentials (for example, within the repository of compromised credentials) and notify a user that the password has been compromised based on the comparison. This may help prevent account takeover associated with a user account. Some embodiments mitigate some of the above-described issues (or other problems described below or that will be self-evident to those in the field) by integrating a repository of compromised credentials with a network accessible resource (for example, private computer networks, online accounts, internet accessible email, social media accounts, online document repositories). By integrating the repository of compromised credentials with a network accessible resource (for example, a private computer network of an enterprise computing system that manages identity, authenticates users, or otherwise authorizes access to secure computing resources based on security credentials), comparison of a user credential with a set of compromised credentials can be performed within the private computer network, thereby making sure that the user credentials associated with a user account are not communicated outside the private computer network. This may help prevent hackers from attempting to access user credentials outside the private computer networks. Some embodiments are configured to detect that credentials have been breached by interrogating the repository, responding by alerting users or system administrators, and preventing or constraining use of the breached credentials, in some embodiments, in an ongoing previously authenticated session. In some cases, compromised credentials are detected and responsive action is taken in real-time (e.g., within 500 milliseconds, 5 seconds, or 5 minutes of when the compromised credential is added to the repository or of when it is used to access resources). Further, some embodiments mitigate some of the above-described issues (or other problems described below or that will be self-evident to those in the field) by implementing one or more password filter criteria so that passwords that are created or changed are strong passwords. It should be noted, though, that several independently useful techniques are described herein, and embodiments consistent with the present disclosure are not limited to those that implement this approach, which is not to suggest that any other description is limiting.

FIG. 1A illustrates a computing environment 100 having components configured to detect compromised passwords and impede efforts by a threat actor to exploit the compromised passwords, in accordance with some embodiments. As illustrated in FIG. 1A, computing environment 100 may include servers 102, client devices 104a-104n, databases 132, local databases 142, and local servers 152. Server 102 may expose an application programming interface (API) 112 and include a communication subsystem 114 and a monitoring subsystem 116. Local server 152 may expose an API 162 and include a communication subsystem 164, a monitoring subsystem 166, a client authentication subsystem 168, or other components (which is not to suggest that other lists are limiting).

Two client devices are shown in FIG. 1A, but commercial implementations are expected to include substantially more, e.g., more than 100, more than 1,000, or more than 10,000. Each client device 104 may include various types of mobile terminal, fixed terminal, or other device. By way of example, client device 104 may include a desktop computer, a notebook computer, a tablet computer, a smartphone, a wearable device, or other client device. Users may, for instance, use one or more client devices 104 to interact with one another, one or more servers, or other components of computing environment 100.

Figure 1B:
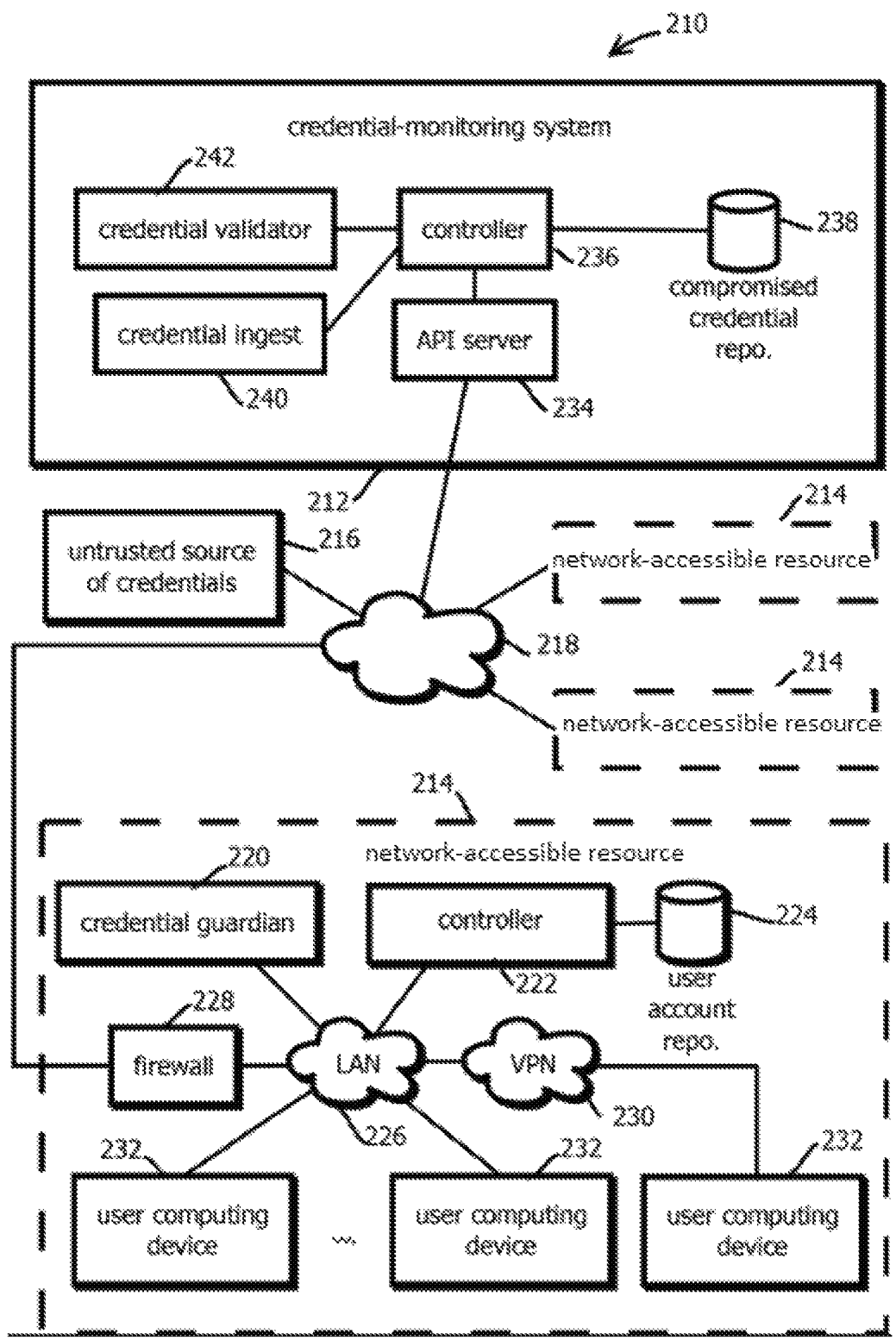
FIG. 1B is a logical and physical architecture block diagram showing another example system for aggregating compromised user credentials and notifying users that their credentials are compromised.

FIG. 1B is a logical and physical architecture block diagram showing another example of a computing environment 210 having a credential-monitoring system 212 (for example, an identity management system such as a password manager) and a credential guardian 220 configured to mitigate some of the above-described problems. In some embodiments, the computing environment 210 is, in some aspects, a more specific version of that described above. In some embodiments, the computing environment 210 includes the credential-monitoring system 212, a plurality of different network accessible resources 214, an untrusted source of leaked credentials 216, and a public network, like the Internet 218. It should be noted that, while one or more operations are described herein as being performed by particular components of credential monitoring system 212 or network accessible resource 214, those operations may, in some embodiments, be performed by other components of credential monitoring system 212, network accessible resource 214, or other components of computing environment 210. As an example, while one or more operations are described herein as being performed by credential monitoring system 212, controller 222, or credential guardian 220, those operations may, in some embodiments, be performed by other components of credential monitoring system 212 or network accessible resource 214.

Three network accessible resources 214 are shown in FIG. 1B, though embodiments are consistent with substantially more. In some embodiments, each network accessible resource 214 may correspond to a different network accessible resource of a different tenant account subscribing to services from the credential-monitoring system 212, for example, in a software as a service offering, or some embodiments may replicate some or all of the system 212 on-premises. In some embodiments, each of the network accessible resources 214 may define a different network accessible resource domain in which authentication and authorization determinations are independently made, for instance, a user authenticated on one of the network accessible resources 214 may not be afforded any privileges on the other network accessible resources 214 in virtue of the authentication. In some cases, each network accessible resource 214 may be a different enterprise network, for instance, on a private subnet hosted by a business or other organization. Examples of network accessible resources 214 may include private computer networks, online accounts, internet-accessible email, social media accounts, online document repositories, etc.

In some embodiments, the network accessible resource 214 may include the above-noted credential guardian 220, a controller 222, a user account repository 224, a private local area network 226, a firewall 228, a virtual private network connection 230, various user computing devices 232, and various network-accessible resources for which access is selectively granted by the controller 222 responsive to authorization and authentication determinations based on user credentials. Generally, authentication is based on confirming the identity of an entity, and authorization is based on whether that entity is permitted to access resources in virtue of being authenticated. In some embodiments, the user computing devices 232 may be physically co-located, or some user computing devices may be remote, for instance, those connecting via a virtual-private network (VPN) connection 230. Three user computing devices 232 are shown, but commercial implementations are expected to include substantially more, and in some cases with substantially more remote computing devices connecting via a plurality of different VPN connections. In some embodiments, the local area network 226 may be addressed by a range of private Internet Protocol addresses assigned to the various illustrated computing devices, and in some cases, those same private Internet Protocol addresses may be used on other network accessible resources 214, for instance, behind a network address translation table implemented by the firewall 228 or a router.

In some embodiments, the controller 222 is an Active Directory™ domain controller or other identity management service configured to determine whether to service authentication requests from user computing devices 232 or other network resources (e.g., computing devices hosting services to which the devices 232 seek access). In some embodiments, the controller 222 may receive requests including a username and one or more security factors, like a knowledge factor credential, such as a password, a pin code, or in some cases, a value indicative of a biometric measurement. The terms "password" and "credential" refer both to the plain-text version of these values and cryptographically secure values based thereon by which possession of the plain-text version is demonstrated, e.g., a cryptographic hash value or ciphertext based on a password. Thus, in some embodiments, these inputs may be received in plain text form, or cryptographic hash values based thereon, for instance, calculated by inputting one of these values and a salt value into a SHA 256 cryptographic hash function or the like, may serve as a proxy.

In some embodiments, the controller 222 may respond to authentication requests by retrieving a user account record from the repository 224 corresponding to the username (a term which is used to refer broadly to refer to values, distinct from knowledge-factor credentials, by which different users are distinguished in a username space, and which may include pseudonymous identifiers, email-addresses, and the like) in association with the request. In some embodiments, in response to the request, the controller 222 may determine whether a user account associated with the username (e.g., uniquely associated) indicates that the user account has a valid set of credentials associated therewith, for instance, that a password has been registered and has not been designated as deactivated, e.g., by setting a flag to that effect in the account to deactivate a previously compromised (e.g., breached, phished, or brute forced) password. In response to determining that the user account does not have a valid set of credentials associated therewith, some embodiments may respond to the requests by denying the request, and supplying instructions to populate a user interface by which new credentials may be registered and stored in the user account.

In some embodiments, in response to determining that the user account has valid credentials, the controller 222 may then determine whether the credentials associated with the request for authentication match those in the user account record, for instance, whether the user demonstrated possession of a password associated with the username in the user account. Possession may be demonstrated by supplying the password in plain text form or supplying a cryptographic hash thereof. In some embodiments, passwords are not stored in plaintext form in the user account repository 224 and cryptographic hashes (for example, farm hashes) of passwords in the user account are compared to cryptographic hashes of user input credentials to determine whether the user has demonstrated possession of the password. In response to determining that the credentials associated with the request do not match those in the user account, in some embodiments, the controller 222 may respond to the request by transmitting a signal indicating that the request is denied to the requesting computing device 232.

In some embodiments, in response to determining that the credentials supplied with the request match those in the user account, some embodiments may respond to the request by authenticating the user and, in some cases, authorizing (or causing other services to authorize) various forms of access to network resources, including access to email accounts, document repositories, network attached storage devices, and various other network-accessible services accessible (e.g., exclusively) on the network accessible resource 214 (e.g., selectively based on the requestor's identity). In some embodiments, upon authentication, various computing devices 232 on the network accessible resource 214 may indicate to one another that they are authorized to access resources on one another or otherwise communicate, e.g., with the Kerbos security protocol, such as the implementation described in RFC 3244 and RFC 4757, the contents of which are hereby incorporated for by reference.

In some embodiments, the controller 222, in response to an authentication determination, may advance the user name to a key distribution center service, which may respond by issuing a ticket-granting ticket. The ticket granting ticket may be a time stamped record, and the record may be encrypted with a secret cryptographic (e.g., in a symmetric or asymmetric cryptographic protocol) key of the key distribution center. The ciphertext may be then transmitted to the user computing device 232. The user computing device 232 may store the received ciphertext in memory for use in communicating with other computing devices on the network accessible resource 214.

Subsequently, an authenticated computing device may receive a request to communicate with another computing device on the network accessible resource 214, e.g., from user input or an application thereon seeking to update state. In response, a secure session may be established between the initiating device and the other computing device. To this end, the ciphertext stored in memory of the initiating computing device may be transmitted to the key distribution center, for instance to its ticket granting service. The ciphertext may be sent in association with an identifier of the computing device to which the requesting computing device has been requested to communicate. The ticket granting service may verify the name of the computing device to which communication is requested, for instance, confirming that it is on a list of permitted computing device identifiers, and the ticket granting service may determine that the ciphertext (e.g., upon decryption or signature verification with a public key) indicates that the ticket is not expired and that the ticket was encrypted with the ticket granting service's secret key. (A negative determination either of these determinations may result in a determination not to authorize the session in some embodiments.) In some embodiments, the ticket granting service may issue a ticket and session keys to the requesting computing device, which may then be sent to the other computing device to which communication is requested. The other computing device may verify the ticket and the session keys to determine whether to respond to the request. Communications in the session may be associated with these values, and each device may verify that each message in the session demonstrates possession by the other device of the appropriate credentials.

In some embodiments, the ciphertexts may expire and be renewed. For instance, some embodiments may determine based on the timestamp of a current ciphertext (or session credentials) by the ticket granting service, the ciphertext is expired, and embodiments may cease to be operative to authorize communication between computing devices. In some embodiments, the user computing device associated with the ciphertext may detect that the ciphertext has expired and automatically request an updated ciphertext. In some embodiments, the determination to grant an updated ciphertext may include querying the credential guardian 220 to determine whether the user credentials upon which the initial authentication determination were based have been subsequently compromised and detected by the credential monitoring system 212. In such an event, in some embodiments, the controller 222 and user computing device 232 may receive a message from the ticket granting service indicating that the domain credential guardian 220 indicates the credentials are compromised and declined to renew the ciphertext (or session credentials), thereby preventing subsequent communication based upon the compromised user credentials. In some embodiments, the user may be invited to designate new user credentials by sending a message to the user computing device 232 instructing the user computing device 232 to present the interface by which new credentials are registered with the controller 222.

In some embodiments, the controller 222 is an Active Directory™ domain controller, and the network accessible resource 214 is a Windows™ domain network. In some embodiments, the credential guardian 220 periodically or in response to various events obtains credentials that have been compromised from the credential-monitoring system 212 or from another source that populates a database with compromised credentials (as described below with regard to FIGS. 2 and 3), for instance every 15 minutes, every hour, every day, or every week, or in response to an event, like a new credential, a new compromised credential, or the like.

In some embodiments, in response, the credential guardian 220 may obtain an updated set of compromised credentials, and in some cases with an update that is based on, and specifies, a difference relative to a previous update to reduce bandwidth and memory usage.

Some embodiments may iterate through a set of updated compromised credentials or existing credentials in the user account repository 224 to compare the credentials in the user account repository with those that have been designated by the credential monitoring system 212 as having been compromised. In some embodiments, the controller 222 may be configured to transmit a message indicating a new credential event to the credential guardian 220 when (e.g., in response to an event in which) a user changes or adds new credentials, and the credential guardian 220 may execute a comparison between the new credentials, for instance applied in the message or associated with the message to those that have been previously designated by the credential-monitoring system 212 as having been compromised. In some embodiments, the comparison is performed within the network accessible resource 214 by the credential guardian 220 via a comparison to downloaded compromise credentials, for instance, to avoid transmitting credentials from the user account repository outside the network accessible resource 214 and to expedite the comparison. Or in some cases, the comparison may be performed remotely by the credential-monitoring system 212, for instance, by transmitting the new credentials in the updated user account record to the credential monitoring system 212 to perform the comparison and send a message indicating a result. In some cases, the transmitted credential may be transmitted in the form of a cryptographic hash of that credential for comparison with cryptographic hashes of compromised credentials using the same cryptographic hash function and salt, like SHA 256 or MD5 hashes, so that comparisons are performed without having access to the credential outside the network accessible resource 214.

Scaling is expected to present challenges with naïve approaches in some implementations. In some embodiments, the number of compromised credentials and the number of credentials in the user account repository may be relatively large, for instance, greater than 100,000, greater than 1 million, greater than 10 million, or greater than 100 million distinct entries corresponding to different distinct sets of credentials (e.g., password/username pairs). Performing a pairwise comparison between the two sets may be a relatively computationally expensive operation, particularly when the comparisons are time sensitive operations to detect potential breaches. Various data structures may be implemented to expedite the operation. Examples include content addressable data structures. For example, embodiments may compare the two sets (e.g., determine the intersection by selecting each entry in one set also present in the other) with a hash table. Some embodiments may store (e.g., store a pointer to, or store a copy of) a compromised credential or subset of the compromise credentials at an address in an array that corresponds to some or all of an output of a hash value based on the credential stored at that address. For example, a 10 digit prefix or suffix of a SHA 256 cryptographic hash of a credential may serve as an index into an array where compromised credentials that produce the same prefix or suffix in the same cryptographic hash function are stored. Some embodiments may perform a comparison by inputting the credential in question from the user account repository into the same hash function, determining the same prefix or suffix as an index into the same array, retrieving each of the compromised credentials at that address, and comparing each of the responsive compromised credentials to the credential in question in the user account repository 224, thereby relatively rapidly identifying a relatively small subset of compromised credentials to compare.

Other embodiments may implement other data structures to expedite the comparisons. Examples include implementations that store compromised credentials in binary trees (e.g., and implement a binary search), sorted lists, prefix trees, radix trees, or other data structures that afford relatively fast access to entries based upon the content of those entries, such that for a given credential from the user account repository 224, potentially matching compromised credentials can be identified relatively quickly (or vice versa). In some embodiments, comparisons may be performed probabilistically, for instance, with a bloom filter or a cuckoo filter. A bloom filter is a space-efficient probabilistic data structure that is used to test whether an element is a member of a set. The bloom filter supports two operations: test and add. Test is used to check whether a given element is in the set or not. For example, if it returns false, then the element is definitively not in the set and if it returns true, then the element is probably in the set. The operation add simply adds an element to the set. Bloom filters help reduce expensive disk (or network) look-up for non-existent keys.

Some embodiments may expedite comparisons through concurrent operations. For example, some embodiments may perform comparisons in a MapReduce framework, for instance mapping sets of compromised credentials and sets of user account credentials to nodes in a cluster computing architecture based on hashes thereof, and reducing out results indicating which credentials match those that have been compromised with a reducing function. In some cases, concurrency may be expedited with heterogenous processing hardware. Some embodiments may implement concurrency with comparisons on a graphical processing unit, for instance performing relatively large number of concurrent comparisons with concurrently operating pixel shaders. Some embodiments may implement the comparison with field programmable gate arrays or other bespoke hardware, for instance, on content addressable memory implemented in a hardware associative array in which a term in a query maps to set of physical hardware addresses by a random-access memory architecture.

In some cases, comparisons are performed sequentially for different parts of a set of credentials, e.g., first usernames of username/password pairs may be compared to produce a set of partial matches, and then passwords may be compared within the set of partial matches to produce a set of full matches. In some cases, usernames (or passwords) may be matched on a character-by-character, exact basis. Or some embodiments may designate usernames with some amount of difference as matching. For example, some embodiments may parse domain names from email-usernames, e.g., stripping the @mailsever and dot com, from an email address, and then matching to the remaining prefix to detect instances in which the same prefix is used as a username on other services. Some embodiments may match usernames within a threshold edit distance, like within a threshold Levenshtein distance. Some embodiments may apply stemming wildcard operators by which threshold amounts of prefix or suffix characters are disregarded when matching or serve as the exclusive basis for matching within the username field. Some embodiments normalize usernames to a canonical representation and then match the canonical representation, e.g., by converting all characters to the same case (e.g., uppercase) and stripping suffixes designating domain names.

In some embodiments, the credential guardian 220 may register various usernames, passwords, or cryptographic hashes thereof with the credential monitoring system 212, and the credential monitoring system 212 may determine (e.g., with any of the preceding comparison techniques) whether values related to the registered usernames, passwords, or cryptographic hashes thereof have appeared in records of compromised credentials. In response to detecting this scenario, the credential monitoring system 212, in some cases, may transmit a message, such as an event record, to the credential guardian 220, and an event handler of the credential guardian 220 may disable the corresponding credential via the controller 222 by sending an instruction to the controller 222 to update a corresponding user account record to designate the credential as invalidated, causing the controller 222 to force the user to supply a new set of credentials in some cases.

Thus, comparisons may be performed on the credential guardian 220, in the (e.g., remote or on-premises) credential-monitoring system 212, and comparisons may be performed responsive to an updated set of compromised credentials, an attempt to use a credential, a new credential a user is attempting to register, or a periodical batch process being run.

In some embodiments, the credential guardian 220 and the credential monitoring system 212 may be co-located on the same network accessible resource 214, or in some cases portions may be implemented as a software as a service model in which the same credential-monitoring system 212 is accessed by a plurality of different network accessible resources 214 hosted by a plurality of different tenants. The credential guardian 220 and the credential monitoring system 212 collectively form an example of a distributed application. Also, a password management application (for example, installed on a computing device and as described below), a browser extension application (for example, installed on a computing device and as described below), and the credential-monitoring system 212 collectively form an example of a distributed application. Other examples of such an application are described with reference to FIG. 1A. The components are described as services in a service-oriented architecture (e.g., where different functional blocks are executed on different network hosts (or collections thereof) and functionality is invoked via network messages).

But embodiments are consistent with other design patterns, e.g., the credential guardian 220 and the controller 222 may be integrated in the same host or process, the credential guardian 220 may operate as an agent on each of the user computing devices, or the credential guardian 220, the controller 222, and the credential-monitoring system 212 may be integrated on a single host or process. The credential guardian 220 may operate as a password management application and a browser extension application installed on a computing device and as described below.

In some embodiments, the credential-monitoring system 212 may include an application program interface server 234, such as a nonblocking server monitoring a network socket for API requests and implementing promises, callbacks, deferreds, or the like. In some embodiments, the controller 236 may implement the processes described herein by which credentials are obtained, and in some cases cracked, validated, stored, and interrogated. In some embodiments, at the direction of the controller 236, for instance responsive to commands received via the server 234, credentials stored in a compromised credential repository 238 may be interrogated to return an updated full set, or result of comparison to credentials determined to have been potentially compromised with the techniques described herein. In some embodiments, the controller 236 is further configured to ingest credentials with the credential ingest module 240 from various remote sources, such as an untrusted source of credentials 216 via the Internet 218. Examples of sources of credentials are described below and include various repositories on the dark web. In some embodiments, received credentials may undergo various types of processing with credential validator 242, for instance, de-duplicate credentials with those previously determined to have been compromised, cracking credentials published in encrypted form, and associating credentials with other user identifiers. Results may be stored in the compromised credential repository 238 and in some cases, one or more the above-described data structures by which compromised credentials are compared with those in user account repository 224 may be updated.

The systems of FIGS. 1A and 1B may execute various processes like those described below, though following processes are not limited by the above implementations, which is not to suggest that any other description herein is limiting. It should be noted that the various processes executed by one or more components of the network accessible resource 214 in FIG. 1B may be executed by one or more of local server 152, client device 104, and local database 142 in FIG. 1A (or vice versa), and the various processes executed by one or more components of the credential-monitoring system 212 in FIG. 1B may be executed by one or more of server 102 and database 132 in FIG. 1A (or vice versa). In other words, the above or below discussed processes executed by one or more components of the computing environment 210 may be executed by one or more components of the computing environment 100 (or vice versa). The repositories and databases discussed in this disclosure may include in-memory data structures, program state, and the like.

Obtaining Compromised Confidential Information

Various approaches may be executed to obtain compromised (e.g., breached, brute forced, or phished) confidential information, like compromised credentials, leaked personally identifiable information (like social security numbers), or financial credentials like account numbers, for purposes of detecting that the information has been compromised. The database 132 and local database 142 illustrated in FIG. 1A or the repository 238 of FIG. 1B may be populated by collecting data from a plurality of sources and using a plurality of data collection techniques. Although a compromised credential repository 238 is illustrated in FIG. 1B as being part of a credential-monitoring system 212, it should be understood that network accessible resource 214 may also include another repository including compromised credentials (i.e., the compromised credentials stored in the compromised credential repository 238). Data corresponding to leaked or stolen assets (including user credentials) may be collected using multiple techniques and from many sources. Some of the techniques for collecting leaked or stolen assets include (a) human intelligence (HUMINT) and applied research (HUMINT+TECHNOLOGY) and (b) scanners and automatic collection tools. HUMINT is an information gathering technique that uses human sources, and may include such a human source acquiring a copy of a set of compromised credentials from the dark web. Both the techniques noted above may be implemented in some cases. Although the scanners and automatic collection tools may be relatively efficient at collecting information from the regular web, manual techniques may be needed in some use cases to collect leaked or stolen assets from the deep or dark web, which is not to suggest that purely automated approaches or any other technique is disclaimed.

The above noted techniques, alone or in combination, collect data from several sources. These sources include, but are not limited to (which is not to imply other lists are limiting), private sources, covert sources, active account takeover (ATO) combination lists, stolen assets, infected users, open sources, private forums, dark web markets, tor hidden services, and pastes. Once the data is collected, the data may be cleansed by putting the collected data through a rigorous quality-control process to determine the value of the collected data. After the data is cleansed, a database may be populated based on the cleaned data.

Figure 2:
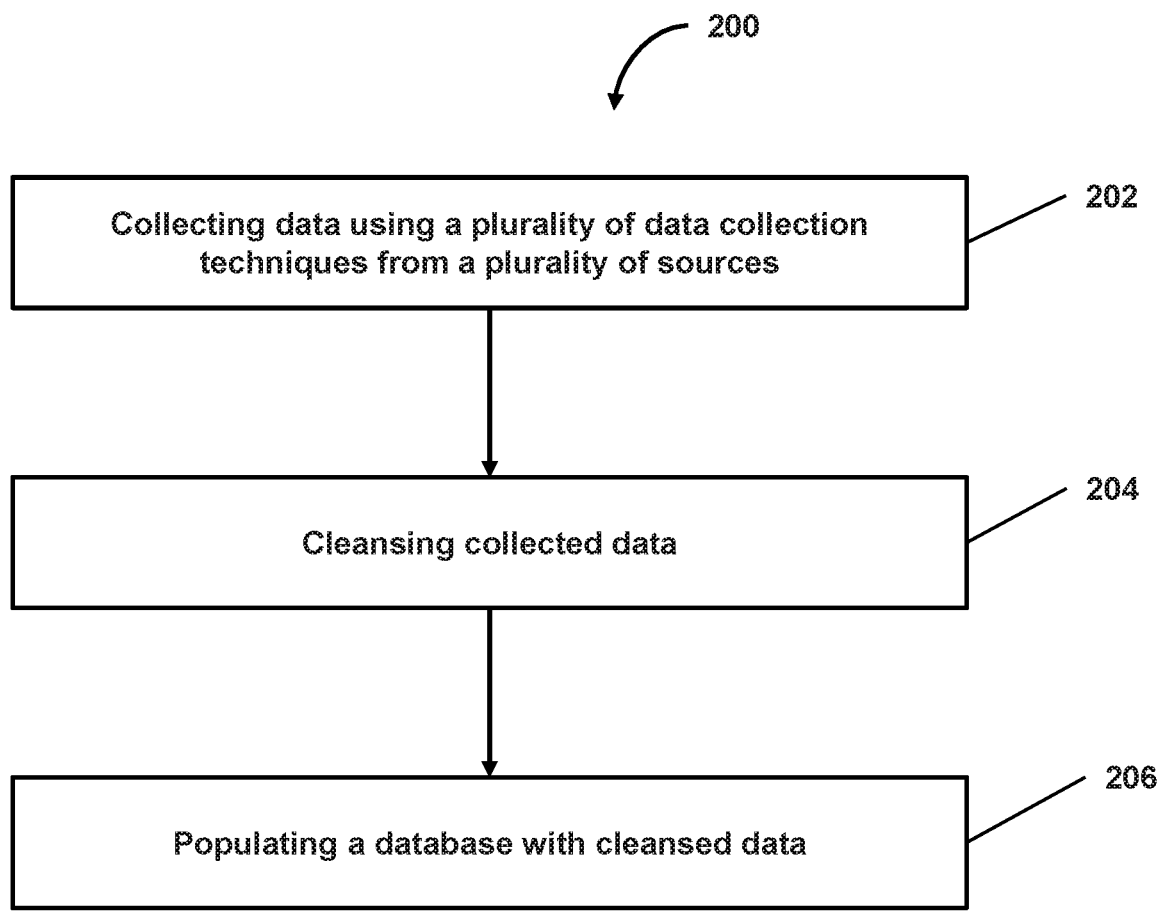
FIG. 2 is a flow chart that illustrates an example process of populating a database suitable for use in the system of FIG. 1A or 1B.

FIG. 2 illustrates an example process 200 of obtaining compromised credentials. The process 200, like the other processes described herein, may be implemented by executing instructions stored on a tangible, machine-readable medium with one or more processors, in some cases, with different processors executing different subsets of the instructions and with different physical memory or computing devices storing different subsets of the instructions. The processes (which includes the described functionality) herein may be executed in a different order from that depicted, operations may be added, operations may be omitted, operations may be executed serially, or operations may be executed concurrently, none of which is to suggest that any other description is limiting. In some embodiments, the processes herein may be implemented in one or more processors (e.g., a term which refers to physical computing components, like a central processing unit, a GPU, a field-programmable gate array, application-specific integrated circuits, and combinations thereof). The processing devices may include one or more devices executing some or all of the operations of the method in response to instructions stored on an electronic, magnetic, or optical storage medium.

In step 202, in some embodiments, data (for example, exposed or stolen data related to personally identifiable information) may be collected using a plurality of data collection techniques from a plurality of sources.

After the data is collected, in step 204, the collected data may be cleansed by putting the data through a rigorous quality-control process to determine the value of the collected data. The cleansing of the collected data may include several steps (examples of which are discussed in more detail below with reference to FIG. 3). The cleansing steps include parsing, normalizing, removing duplicates, validating, and enriching. Once the data is cleansed, in step 206, a database may be populated with the cleansed data. This data may then be used to determine whether one or more passwords match a password used by a user to gain access to a private computer network and in response to a determination that one or more passwords match the password used by a user, block access to a user account, reject a use of the password by the user, or cause the user to change the password.

Figure 3:
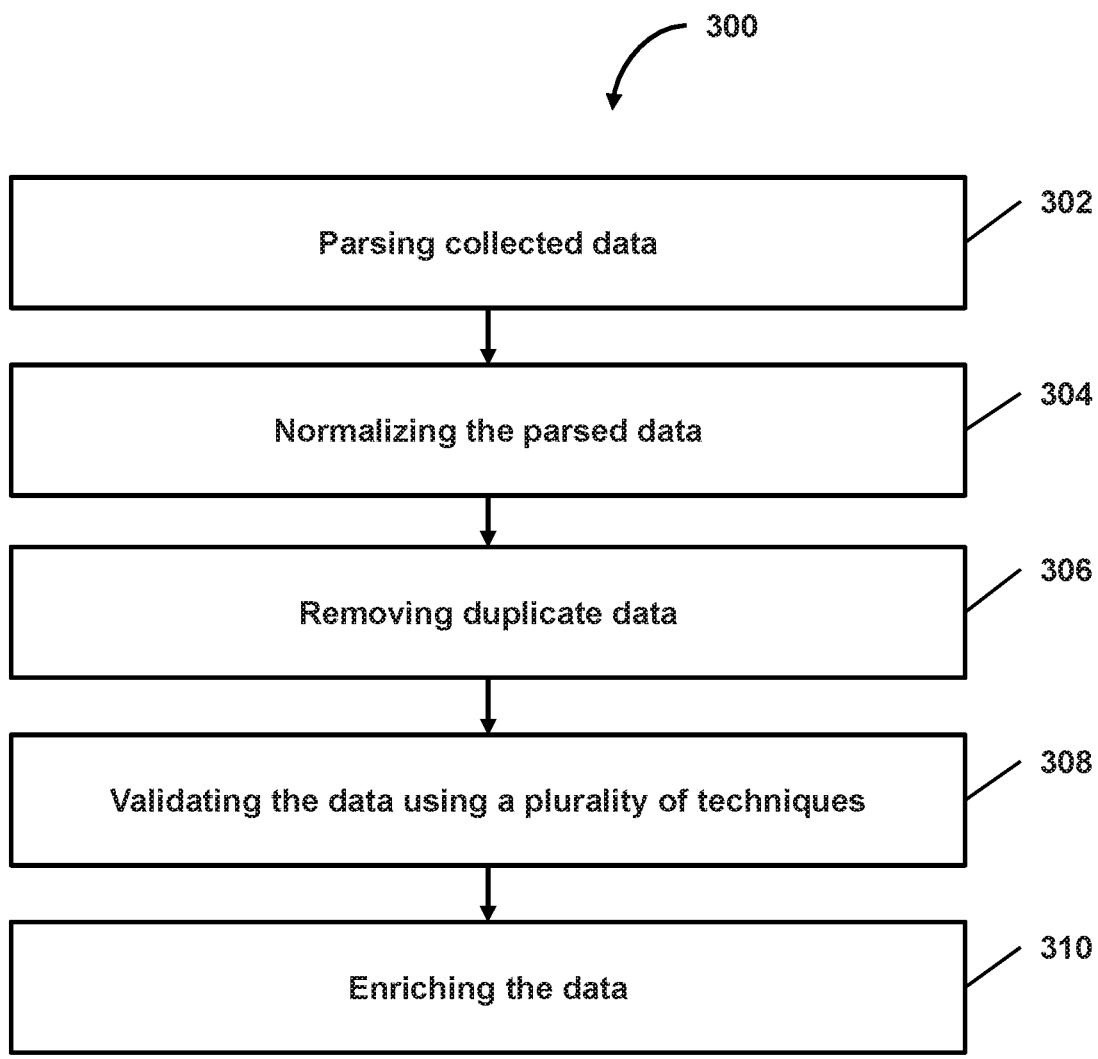
FIG. 3 is a flowchart describing an example of a process of cleansing collected data.

FIG. 3 illustrates an example process 300 of cleansing collected data described in step 204 in FIG. 2. In step 302, in some embodiments, the collected data is parsed and the parsed data is normalized in step 304. During the normalization process, in some embodiments, the data is parsed and classified into different fields (for example, date of birth, user name, password, domain name, etc.). Also, during the normalization process (or during any step illustrated in FIG. 3), data that is not relevant may be deleted. For example, data records that do not include passwords or high value personal identification information may be discarded.

In step 306, duplicate data may be removed. During this step, in some embodiments, the normalized data may be compared to more than one or ten billion assets already stored in the database 132 (for example, the data collection database 134) or local database 142 (for example, the data collection database 144) and data that are duplicates may be discarded. In some cases, the above techniques configured to expedite pairwise matching of sets may be implemented to perform deduplication. Although duplicate data may be discarded, the database 132 or local database 142 may keep a record of a number of duplicates that were retrieved from unique sources.

In step 308, the data may be then validated using a plurality of techniques. Routines such as "validation rules," "validation constraints," or "check routines" may be used to validate the data so as to check for correctness and meaningfulness. The rules may be implemented through the automated facilities of a data dictionary, or by the inclusion of explicit application program validation logic.

Finally, in step 310, the data may be enriched so that the database 132 (for example, the data collection database 134) or local database 142 (for example, the data collection database 144) may be populated with, for example, how many times user credentials have been ingested from a unique source, the severity of each individual record, and additional metadata combined from different sources.

The populated database 132 (for example, the data collection database 134 or repository 238) or the local database 142 (for example, the data collection database 144) may take a number of forms, including in memory or persistent data structures, like ordered or unordered flat files, Indexed Sequential Access Method (ISAM), heap files, hash buckets, or B+ trees. In some embodiments, the data may be relatively frequently (e.g., more than once a week on average) collected, cleansed, and populated.

Detecting Use of Passwords that Appear in a Compromised Credential Repository by an Identity Management System As noted above, exposed or stolen passwords are a problem across industries. Some of the present techniques (for example, as illustrated in FIGS. 1A and 1B) afford efficient and proactive ways of retrieving and receiving compromised credential data (for example, exposed or compromised passwords) that match credential data used by a user to gain access to a private computer network, notifying a user associated with the compromised credential that the credential for the user account has been compromised, notifying the user to change the compromised password to a different password, and blocking access to a user account associated with the credential data used by the user in response to a determination that the retrieved and received compromised credential match compromised credential data. The matching of credential data and compromised credential data and notifying that a password has been compromised may be performed by an identity management service (for example, a password management service). The credential-monitoring system 212 may provide a password management service or a separate identity management system (not shown) may provide a password management service. In the case where a separate identity management system provides a password management service, such a system may be also be integrated with compromised credential data from the compromised credential repository 238 so as to perform comparisons between credential data and a set of compromised credential data. For this portion of the disclosure, we are assuming that the credential-monitoring system 212 provides password management services, although the use of the credential-monitoring system 212 is not limited to providing password management services. A password management service may stores a plurality of user credentials associated with a plurality of user accounts (to access different services) associated with a user so that the user doesn't have to remember different passwords for different user accounts. A password manager provides a single-sign-on features, whereby a user may user a single password to sign on to a password manager application to be able to access the different user credential data. Once logged into the application of the password manager, a user may be able to access different user credential data (which may have been previously registered with the application) or add new user credential data. Password management services may also recommend complex passwords (different from user selected passwords) associated with a user account. For example, if a user wishes to create a user account with an enterprise, the password management service may recommend a complex password including numerical, alphabetical, or other characters on a keypad. The password management service may also provide a user with a plurality of different complex passwords based on whether the password requires numerical characters, alphabetical characters, number of characters, etc.

In some embodiments, the password management service may be a distributed service that includes a portion of its service within user computing devices 232 and another portion within the credential-monitoring system 212. For instance, user computing devices 232 may include a password management application (for example, the credential guardian 220 may operate as a password management application within a user computing device 232) via which the passwords for different user accounts may be managed. For example, a password management application may be downloaded by a user computing device 232 and user credential data may be entered for different user accounts. The user credential data may be stored locally within the user computing device 232 or may be stored in a user credential repository (not shown) in the credential-monitoring system 212. The credential data stored locally or in user credential repository in the credential-monitoring system 212 are encrypted, for example, using an encryption key derived from a master password (which is described below). The password management application (which may be installed on a user computing device 232) allows a user to log into the password management application using only a single password (for example, via a single-sign-on using the master password) and provides access to a plurality of user credentials associated with a plurality of user accounts based on the master password. Accordingly, a user only needs to remember a single master password and can access a plurality of different accounts using the password management service without having to remember individual account passwords. As such, a user associated with a plurality of different user accounts may only need to remember a single master password in order to be able to access the different user accounts.

In some embodiments, in addition to the password management application, a browser extension application (for example, the credential guardian 220 may operate as a browser extension application within a user computing device 232) associated with the password management application may also be installed on a user computing device 232 (for example, on a browser). The browser extension application facilitates a web browser with auto fill and auto submit functionality for login forms on web pages. The password management application and the browser extension application may communicate (for example, using Stanford Javascript Crypto Library (SJCL)) with each other in order to exchange stored data and to fill in the credential data to login forms of the web sites. When a user logs into the password management application, the browser extension application may activate itself by sending health messages to the password management application. As such, both these applications begin to communicate by sending and responding to health messages. When a user launches a web application with a login form, the browser extension application may read the URL and the title of the webpage and may encrypt this data (i.e., the URL and the title of the webpage) and send it to the password management application. Based on the received encrypted data, the password management application returns login credentials (which may be locally stored or stored remotely in the credential-monitoring system 212) of the matching entry to the browser extension application. The browser extension application then decrypts the credentials and displays them in the login form. The browser extension application may auto fill and auto submit the login credentials and accordingly, a user may be logged in to access the web application.

In some embodiments, the password management application may include a password generator that generates complex passwords different from the password to access the user account. For example, if a user already has a password to access a gmail account, the password management application may generate a new complex password based on different criteria (length of characters, digits, symbols, words, etc.) for the gmail account. In other words, a user using the password management application may be able to generate a new complex password associated with his or her user account and based on the generated password, the user may change his or her password associated with the user account to the newly generated complex password. This way, a user's password associated with a user account is complex and chances of such a password being guessed becomes significantly lower.

As noted above, in some embodiments, a password management service may be a distributed service that includes a portion of its service within, for example, a user computing device 232 and another portion within the credential-monitoring system 112.

In some embodiments, the controller 222 may authenticate and authorize all users and computers (for example, client device 104 or user computing device 232) in a network by assigning and enforcing security policies for all computers and installing or updating software. For example, when a user logs into a computer (for example, client device 104 or user computing device 232), controller 222 may check the submitted password and determine whether the user is a system administrator or a normal user. Based on a match of the user credentials of the user with stored user credentials (for example, stored in the local miscellaneous database 146 or user account repository 224), the controller 222 may determine whether to grant access to the user as a system administrator or a normal user. In some embodiments, the network accessible resource 214 may be associated with a website or a company, and the controller 222 may grant access to the website or information within the company's network when the user credentials match stored user credentials (for example, stored in the user account repository 224). The client device 104 or the user computing device 232 may be a customer that seeks to access a website using the customer's user credentials or may be an employee of a company that seeks to access information within a company's network.

In some embodiments, one or more credential data (for example, one or more knowledge factor credentials, like passwords, pin codes, or lock-screen patterns) of one or more user accounts may be compared to compromised credential data (for example, one or more compromised passwords) in order to determine if the credential data associated with the user account has been compromised. As noted above, the credential data corresponding to a plurality of user accounts may be obtained by the credential-monitoring system 212 via the password management application installed on the user computing device 232. The credential data of the plurality of user accounts may be stored in a user account repository (not shown) in the credential-monitoring system 212.

The credential-monitoring system 212 may run a periodical batch process in order to determine whether any of the credential data in the user account repository (for example, within the credential-monitoring system 212) obtained via the password management application has been compromised and to prevent account takeover. In other words, the credential-monitoring system 212 may run a batch process at a scheduled time in order to compare the credential data with the set of compromised credential stored in the compromised credential repository 238. Alternatively, or additionally, the credential-monitoring system 212 compare the obtained credential data to the compromised set of credential data in response to a user adding (or attempting to add) a new password for a new user account or to a user changing a previous password associated with a user account via the password management application. In other words, when a new user account and a new password is added by a user via the password management application, the credential-monitoring system 212 may compare the newly added password to the set of compromised credential data. Further, when a user changes a password via the password management application, the credential-monitoring system 212 may compare the changed password to the set of compromised credential data. Accordingly, not only does the credential-monitoring system 212 run a batch process to compare credential data with compromised credential data, the credential-monitoring system 212 may also compare the credential data with the compromised credential data in response to a user adding (or attempting to add) a new password for a new user account or to a user changing a previous password associated with a user account via the password management application.

In some cases, as noted above, the comparison between the credential data and the compromised credential data may be performed remotely by, for example, the credential-monitoring system 212. As noted above, the credential data may be transmitted from, for example, the user computing device 232 (for example, via the password management application) to the credential-monitoring system 212 in the form of a cryptographic hash of that credential for comparison with cryptographic hashes of compromised credentials using the same cryptographic hash function and salt, like SHA 256 or MD5 hashes, so that comparisons are performed without having access to the credentials outside the network accessible resource 214. The match between the credential data and the compromised credential data may be determined based on a cryptographic hash collision. References to a "password" or "credential" herein should be read broadly to refer to both the plain-text form thereof and a cryptographic hash thereof or deterministic cyphertext thereof suitable for comparison to other transformed versions of the password or other credential to detect matches without possession of the plaintext version.

In some cases, in response to receiving the credential data, the credential-monitoring system 212 may compare (for example, at a scheduled time or as soon as the credential data is received) the received credential data and the compromised credential data stored in the compromised credential repository 238 to obtain compromised credential data that matches the credential data. For instance, the credential data obtained via the password management application may include one or more passwords, and the credential-monitoring system 212 may compare (for example, by querying the compromised credential repository 238. The query may be an SQL (Structured Query Language), an MDX (Multidimensional Expressions) query, or the like) the received one or more passwords with the compromised credential data of the compromised credential repository 238 to check whether the one or more obtained passwords match one or more compromised passwords stored in the compromised credential repository 238. In other words, the credential-monitoring system 212 may perform a comparison of a first set of credential data (for example, the one or more passwords obtained via the password management application) and a second set of data (for example, the one or more compromised passwords stored in the compromised credential repository 238). In some embodiments, the number of compromised credentials in the compromised credential repository 238 and the number of credentials obtained via the password management applications from a plurality of user computing devices 232 may be relatively large, for instance, greater than 100,000, greater than 1 million, greater than 10 million, or greater than 100 million distinct entries corresponding to different distinct sets of credentials. Accordingly, as noted above, performing a comparison between two sets of data may be a relatively computationally expensive operation, particularly when the comparisons are time sensitive operations to detect potential breaches. In order to address this challenge, various data structures may be implemented to expedite the operation, comparisons may be expedited through concurrent operations, or comparisons may be performed sequentially for different parts of a set of credentials. The details to address this challenge of performing a comparison between two large sets of data have been addressed above, and for the sake of brevity, are not repeated.

In some embodiments, the credential-monitoring system 212 may determine one or more criteria for comparing the credential data and the compromised credential data to make the search process more efficient. In some embodiments, one or more criteria for the comparison may be generated by the credential-monitoring system 212 based on various factors. For example, a criterion for the comparison (e.g., a value of a field in a where clause) may be determined based on whether another comparison identifying the same credential data has been previously made. In other words, the credential-monitoring system 212 may determine whether the credential data (that is currently identified in a comparison) has also been identified in one or more previous comparisons. Whenever a credential-monitoring system 212 compares the credential data and the compromised credential data, a record (for example, metadata related to the comparison) may be kept of such a comparison in a repository. Such a record may include a date and time of the comparison, a location (for example, IP address) from where the request for comparison is received, credential data identified in the comparison, or various other data related to the obtained credential data.

In some embodiments, for instance, the credential-monitoring system 212 may retrieve a previous date and time the obtained credential data was identified in a previous comparison, and use this date and time to generate a search criterion for the comparison. In response to determining that the credential data has been previously identified in another comparison, the current comparison of the credential data and the compromised credential data in the compromised credential repository 238 may be limited to, for example, data that has been populated (for example, populated into the compromised credential repository 238) on or after the date (or time) the credential data was previously identified in the other comparison. In some embodiments, when (e.g., in response to an event in which) the credential-monitoring system 212 determines that another comparison identifying the same credential data (which is identified in the current comparison) has been previously obtained, the credential-monitoring system 212 may generate a search criterion for the comparison such that data (related to the credential data) that is retrieved from the compromised credential repository 238 corresponds to data that was populated into the compromised credential repository 238 on or after a date or time of the previous comparison.

In some embodiments, once the comparison and the search criterion are requested and generated, compromised credential data that match the credential data identified in the comparison is retrieved from the compromised credential repository 238 based on the comparison and the criterion for the comparison. In some embodiments, when (e.g., in response to an event in which) it is determined that the credential data has not been previously identified in a previous comparison, the search criterion may cause embodiments to require the entire compromised credential repository 238 to be searched in order to retrieve compromised credential data (for example, one or more passwords) that matches the credential data identified in the current comparison. On the other hand, when (e.g., in response to an event in which) it is determined that the credential data has been previously identified in a previous comparison, the search criterion may cause embodiments to require only a portion of the compromised credential repository 238 (the portion that includes data populated on or after the date or time the previous comparison was performed) to be searched in order to retrieve compromised credential data (for example, one or more passwords) that matches the credential data identified in the current comparison. In some embodiments, the compromised credential repository 238 may be indexed in such a manner that compromised credential data populated in the compromised credential repository 238 at different times can be easily distinguished during a search process.

The above descriptions make the data retrieval process more efficient relative to simpler data access techniques. Allowing the search to be performed on only a portion (or subset) of the compromised credential repository 238 decreases the time taken to retrieve compromised credential data that match the credential data, reduces the use of computer resources of, for example, the credential-monitoring system 212, and provides the retrieved compromised credential data to a recipient sooner so that the recipient may act on the such data in a quicker manner, thereby preventing account takeover sooner than later. In other words, in some embodiments, the entire compromised credential repository 238 may not need be searched and only a portion (or subset) of the compromised credential repository 238 may need to be searched to retrieve compromised credential data that match credential data, none of which is to suggest that simpler data access techniques or any other subject matter are disclaimed.

In some embodiments, a portion of a user credential data (for example, a portion of a password) may be compared to the set of compromised credential data by the credential-monitoring system 212. In other words, the credential-monitoring system 212 may parse the password and compare the parsed password with the set of compromised credential data using the above-described techniques. By parsing the password, the comparison between the parsed password and the set of compromised credentials might be quicker than the comparison of the entire password with the set of compromised credentials. If there is a match between the parsed password and one or more compromised credentials, the credential-monitoring system may compare the entire password to the one or more compromised credentials (that match the parsed password) to determine whether the one or more credentials match the entire password. Such a process of comparing the parsed password to the set of compromised credentials may allow credential-monitoring system 212 to find a match quicker.

In some embodiments, the compromised credential data (for example, one or more passwords) retrieved from the compromised credential repository 238 may include metadata associated with the one or more passwords retrieved from the compromised credential repository 238. Such metadata may include a date of exposure of the one or more passwords, a number of exposures of the one or more passwords, or a location of exposure of the one or more passwords. The date and time of exposure of the one or more passwords may correspond to the date and time at which the one or more passwords was collected during the collection of data using a plurality of data collection techniques from a plurality of sources in step 202 of FIG. 2. During the step of collecting data in step 202 of FIG. 2, the collected data may be correlated with a date and time of collection of the data. In some embodiments, the date and time of exposure of the one or more passwords may correspond to the date and time at which the one or more passwords was exposed within the source.

In some embodiments, the retrieved metadata may include a number of exposures of the one or more passwords. For example, the same password may be exposed within a plurality of sources. Accordingly, a record may be kept in the compromised credential repository 238 regarding a number of exposures of the same password. In other words, the compromised credential repository 238 may keep a record of a number of sources from which the same password was collected during the data collection and data cleansing steps illustrated in FIGS. 2 and 3. Further, in some embodiments, the retrieved metadata may include a location of exposure of the one or more passwords. During the data collection step 202, a record may be kept of the location from which the data is collected. For example, a password may have been exposed on the dark web or a blog post, and such information regarding the location of the exposure may be collected during the data collection step 202 in FIG. 2 and may be retrieved in response to a query identifying the credential data. Such retrieved metadata may be sent to a user computing device 232 via the password management application.

In some embodiments, the credential-monitoring system 212 may set reminders for comparing the credential data and the compromised credential data in the compromised credential repository 238 for additional compromised credential data that match the credential data within a certain amount of time after a previous comparison (identifying the credential data) is made. The reminder may be set so that the credential-monitoring system 212 compares the credential data and the compromised credential data in the compromised credential repository 238 for additional compromised credential data that match the credential data within a predetermined amount of time after a previous comparison (identifying the credential data) is made. The reminder may be set based on a number of retrieved passwords. Additionally, the certain amount of time may vary based on the number of retrieved passwords. For instance, the certain amount of time may be inversely proportional to the number of retrieved passwords. Reminders may be stored in a repository within the credential-monitoring system 212.

Further, in some embodiments, an operation to compare the credential data and the compromised credential data in the compromised credential repository 238 within a certain amount of time after a previous comparison (identifying the credential data) is made may be scheduled based on a date of exposure (for example, a latest date of exposure) of the retrieved one or more compromised passwords based on the previous comparison. The credential-monitoring system 212 may determine the latest exposure date among the exposure dates of the retrieved one or more passwords, and may set a reminder for comparison of the credential data and the compromised credential data in the compromised credential repository 238 to be within a certain amount of time based on the latest date of exposure.

Based on a comparison of a first set of credential data (for example, one or more passwords obtained via the password management application) and a second set of compromised credential data (for example, one or more passwords in the compromised credential repository 238), the credential-monitoring system 212 may determine that there is a match between the first set and second set of data. The credential-monitoring system 212 may retrieve one or more compromised credential data (for example, one or more passwords from the compromised credential repository 238) that match the credential data (for example, one or more passwords from the user account repository 224).

Further, in some embodiments, the credential-monitoring system 212 may determine whether the retrieved compromised credential data (for example, one or more passwords from the compromised credential repository 238) that match the credential data (for example, one or more passwords from the user account repository 224) satisfy a criterion. In some cases, determining whether the retrieved compromised credential data (for example, one or more passwords from the compromised credential repository 238) that match the credential data (for example, obtained via the password management application) satisfy criteria criterion may include determining whether a number of the one or more compromised credential data that match the credential data exceeds a threshold. The threshold may be any number (for example, 1 or greater). For example, a password may only match with one password from the compromised credential repository 238. In such an instance, if the threshold to satisfy the predetermined criteria is two, then the single match between the password with one password from the compromised credential repository 238 may not satisfy the criterion. However, if the threshold to satisfy the criterion is two and the password matches with three passwords from the compromised credential repository 238, then the criterion may be satisfied. An advantage of using a criterion based on a threshold is to eliminate the need to block access to a user account or to request a user to change his or her password simply because a password match is found in the compromised credential repository 238. User accounts using passwords that have been exposed more than a certain number of times may be more likely to be exposed to hackers than passwords that have been exposed less than a certain number of times, and therefore, by requiring criteria criterion to be satisfied based on a threshold, account take over of user accounts that have a higher likelihood of being compromised may be prevented.

In some embodiments, in addition to retrieving compromised password(s) that match the passwords obtained via the password management application, user identifications (for example, usernames) associated with the compromised passwords that match the passwords obtained via the password management application may also be retrieved from the compromised credential repository 238. The credential monitoring system 212 may determine whether the compromised passwords from the compromised credential repository 238 satisfy a criterion by comparing the usernames associated with the compromised passwords and the usernames associated with the passwords obtained via the password management application. In response to a match between the username associated with a compromised password and a username associated with a password (for example, obtained via the password management application), the criterion is satisfied.

In response to a determination that one or more compromised passwords (that match one or more passwords obtained via the password management application) from the compromised credential repository 238 satisfy the criterion, the credential-monitoring system 212 may inform a user (associated with the compromised password) via the password management application that the password associated with a user's account has been compromised and may inform a user to change the password because the password has been compromised. In addition to informing a user, the credential-monitoring system 212 may inform, for example, an enterprise (for example, controller 222 of the network accessible resource 214 that grants access to a user account based on a username and the compromised password) that the password associated with a user's account has been compromised and may instruct the enterprise (for example, the controller 222) to request the user to change the compromised password or to block the user account associated with the compromised password. In response to receiving such information, the controller 222 may block access to a user account associated with a password that matches one or more compromised passwords from the compromised credential repository 238 and may notify the user to change the compromised password. In other words, in response to determining that one or more compromised passwords (that match one or more passwords obtained via the password management application) from the compromised credential repository 238 satisfy the criterion, a user attempting to access a user account associated with the one or more compromised passwords may be prevented from accessing the user account. Although blocking a user account may be an annoyance to the user using the user account, blocking access to the user account will ensure that a hacker won't be able to hack into the user account until the user of the user account has changed credential data associated with the user account.

In some embodiments, a user may be currently accessing a user account when it is determined that the retrieved one or more compromised passwords matches a password associated with the user account. In such an instance, the credential-monitoring system 212 may inform a user (for example, via the password management application) that the user's password associated with a user account has been compromised and to change the user's password. In addition, as noted above, the credential-monitoring system 212 may also inform an enterprise (for example, controller 222 of the network accessible resource 214 that grants access to a user account based on a username and the compromised password) that a user's password has been compromised and instruct the enterprise (for example, the controller 222) to notify the user to change the compromised password or to block access to a user account associated with the compromised password. In response, the controller 222 may notify the user of the user account that the user account has been exposed, that the functionalities (certain essential functionalities of the user account) of the user account of the may be disabled within a predetermined amount of time, and to change the password for the user account immediately. As noted above, certain functionalities of the user account may be disabled by the controller 222, thereby, forcing the user of the user account to take immediate action in changing the password of the user account. Further, in some embodiments, the controller 222 may also automatically log out the user from the user account after a certain period of time (for example, a certain period of time after it is determined that the retrieved one or more compromised passwords matches a password associated with a user account) if the user has not changed the password for the user account. After automatically logging the user out of the user account, the controller 222 may block access to the user account until the password of the user account has been changed.

In some embodiments, a user of the user account may not be currently accessing the user account when it is determined that the retrieved one or more compromised passwords matches a password associated with the user account. In such an instance, the credential-monitoring system 212 may inform a user (for example, via the password management application) and an enterprise (for example, controller 222 of the network accessible resource 214 that grants access to a user account based on a username and the compromised password) that a user's password has been compromised and the controller 222 may block access to the user account in response to the user attempting to access the user account and during the attempt to access the user account, the user of the user account may be notified to change the password associated with the user account. The credential-monitoring system 212 (via the password management application) may also request the user to change the password because the password has been compromised.

In some embodiments, in response to a determination that one or more compromised passwords (that match one or more passwords obtained via the password management application) from the compromised credential repository 238 satisfy the criterion, the credential-monitoring system 212 or the controller 222 may cause a user associated with a user account to be notified to change the password associated with the user account. Such a notification may be via email, text, phone call, password management application, or any form of communication to notify the user of the user account to change the password associated with the user account to prevent account takeover. In some embodiments, the notification may sent to the user via a means different from the user identification (which is used to access the user account). For example, if the user identification john.smith@gmail.com is used to access a user account and the password associated with this user account matches the retrieved one or more compromised passwords, then the credential-monitoring system 212 or the controller 222 may notify the user of the user account to change the password via a different user identification (for example, a different email associated with the user of the user account) or via a different means of communication (for example, text, phone call, etc.). The different user identification or information regarding a different means of communication may be stored within and obtained from the user account repository 224. By notifying a user of the user account via a different user identification or via a different means of communication, the present techniques are expected to avoid the possibility of a third party (for example, a criminal party) being able to change the password before the user of the user account is able to. Accordingly, some embodiments may notify the user of the user account that the password has been compromised via a different user identification or via a different means of communication to prevent account takeover.

In some embodiments, the user associated with the user account may be notified to change the password associated with the user account when (e.g., in response to an event in which) the retrieved one or more compromised passwords matches the password associated with the user account. As noted above, the notification may be via email, text, phone call, or any form of communication to notify the user of the user account to change the password associated with the user account to prevent account takeover. Additionally, or alternatively, a user may be notified to change a password via the same display screen via which the user is attempting to create a new password for a new user account or change a previous password associated with a user account.

In some embodiments, in addition to notifying the user of the user account that the password associated with the user account has been exposed, the credential-monitoring system 212 may also notify metadata associated with the one or more compromised passwords that matches the password associated with the user account. The metadata may include a number of exposures associated with the one or more compromised passwords, a date and time of exposure of the each of the number of times the password has been exposed, or a location of exposure of the one or more compromised passwords. In some embodiments, the user of the user account may be provided with additional details regarding the compromised password. For instance, the user may be notified of a number of times the password associated with the user account has been exposed, a date and time of exposure of each of the number of times the password has been exposed, or a location (or locations) of exposure of the password. The date and time of exposure of the password may provide the user with valuable information. The date and time of the exposure may allow the user to remember the user's previous use of the user account on a particular day and time, which may help the user determine the cause of exposure of the password associated with the user account, thereby helping prevent the user from exposing the user credentials in a similar fashion.

The network accessible resource 214 may also keep a record (for example, in a repository) of a number of notifications that are sent to a user of a user account to change passwords associated with the user account in the user account repository 224. In other words, in some embodiments, the controller 222 may require the user of the user account to change the password associated with the user account many times, and the number of times the controller 222 has required the user of the user account to change the passwords (for example, different passwords) may be recorded in a repository (for example, the user account repository 224). In some embodiments, when (e.g., in response to an event in which) the user of the user account has been required to change the passwords associated with the user account a certain number of times, then the controller 222 may classify such a user account as a high-risk user account (or the user as a high-risk user). In some embodiments, if the user account has been classified as a high-risk user account, then the user of the user account may be required to perform a two-factor authentication prior to being granted access to the user account. In other words, the user of the user account may now need to provide a password and another form of authentication in order to be able to access the user account. In some embodiments, if the user account has been classified as a high-risk user account, then the user may be required to change one or more of the user identification, the password, and the security questions and answers associated with the user account in order to access the user account.

In some embodiments, once the user is notified to change the password associated with the user account, the user may be presented by embodiments with the opportunity to change the password or change the security questions and answers. In some embodiments, the user of the user account may be provided with a set amount of time to complete the process of changing the password associated with the user account or changing the security questions and answers associated with user account. If the user of the user account fails to change the password within the set amount of time, the user may need to provide additional information (other personally identifiable information) to verify the user's identity in order to be able to change the password associated with the user account. Once the user of the user account changes the password associated with the user account, the user of the user account may be granted access to the user account. Accordingly, by granting access to a user account only after the password associated with the user account has been changed, the present techniques are expected to help prevent account take over by malicious actors.

Filtering Passwords Based on a Plurality of Criteria

In some embodiments, enterprises may not want user credential data to be transmitted outside of the network-accessible resource 214 (for example, a private computer network). In such cases, the network-accessible resource 214 may obtain compromised credential data so that the comparison between user credential data (for example, stored in the user account repository 224) and compromised credential data may be performed within the network-accessible resource 214 without having to send user credential data outside of the network-accessible resource 214. In some embodiments, the network accessible resource 214 may also include a compromised credential repository (including compromised credential data). The compromised credential repository (not shown) within the network accessible resource 214 may receive compromised credential data from the compromised credential repository 238 upon request by the credential guardian 220 (or controller 222), in response to an update to compromised credential repository 238, or at predetermined times. In other words, the compromised credential data may be pushed from the compromised credential repository 238 to the compromised credential repository within the network accessible resource 214. The compromised credential repository within the network accessible resource 214 may receive over 1 million compromised credentials, over 10 million compromised credentials, over 100 million compromised credentials, over 1 billion compromised credentials, etc. In some embodiments, it may be challenging to handle naïve approaches for comparing the credential data and the compromised credential data within the network-accessible resource 214 in order to determine whether any of the credential data has been compromised because the number of credential data and the number of the compromised credential data may be very large and the credential data and the compromised credential data may change frequently. It some embodiments, it may be different to compare such large sets of credential data with commercially reasonable latency with naïve approaches like just iterating through a non-ordered list to compare. Performing a comparison between two sets of data may be a relatively computationally expensive operation, particularly when the comparisons are time sensitive operations to detect potential breaches. In order to address this challenge, various data structures may be implemented to expedite the operation, comparisons may be expedited through concurrent operations, or comparisons may be performed sequentially for different parts of a set of credentials. The details to address this challenge of performing a comparison between two large sets of data have been addressed above, and for the sake of brevity, are not repeated.

It should be understood that the operations described above as being performed by credential-monitoring system 212 may be performed by credential guardian 220 within the network accessible resource 214 and the operations discussed as being performed by the credential guardian 220 may also be performed by the credential-monitoring system 212. Additionally, all the operations described above also apply to this portion of the disclosure relating to filtering passwords and therefore, many of the details are not repeated for the sake of brevity.

As noted above, exposed or stolen passwords are a problem across industries. Some of the present techniques (for example, as illustrated in FIGS. 1A and 1B and as discussed throughout this disclosure) afford efficient and proactive ways of determining whether a password satisfies one or more criteria, and in response to determining that the password satisfies one or more criteria, such a password may be rejected and a user associated with the password may be notified to change the password.

In some embodiments, the controller 222 (or credential guardian 220) of the network accessible resource 214 may obtain credential data. The credential data may be obtained in response to a user attempting to create a password associated with a username, a user attempting to change a previous password associated with a username to a new password, or a user attempting to login to a user account using a password. Additionally, or alternatively, the credential data may be obtained by the controller 222 (or credential guardian 220) from the user account repository 224. In some embodiments, the user credential data may be obtained by the controller 222 (or credential guardian 220) in response to an update to the compromised credential repository within the network accessible resource 214 or an update to the user account repository 224.

In some embodiments, the credential guardian 220 may determine whether the obtained password (or a plurality of passwords) satisfies one or more criteria from among a plurality of criteria. In some embodiments, the plurality of criteria may include: (a) determining whether a password matches one or more passwords that have been known to be compromised, (b) determining whether a password includes repetitive or sequential characters, (c) determining whether a password includes dictionary words, (d) determining whether a password includes context-specific words, (e) determining whether a password includes characters less than a minimum number of characters or greater than a maximum number of characters, and (f) determining whether the password has greater than a threshold amount of entropy.

In some embodiments, determining whether a password matches one or more passwords that have been known to be compromised may include comparing, with the credential guardian 220, the password to a set of compromised credential data within a compromised credential repository within the network accessible resource 214. Based on a comparison of the password and the credential data within a compromised credential repository within the network accessible resource 214, the credential guardian 220 may determine whether the password matches one or more passwords within the compromised credential repository within the network accessible resource 214. Details with regard to comparisons of credential data and compromised credential data have been discussed above in detail with regard to the credential-monitoring system 212, and therefore, for the sake of brevity, are not repeated. As noted above, the credential guardian may perform the operations (for example, the comparison of the credential data and the compromised credential data) disclosed above as being performed by the credential-monitoring system 212. In response to one or more compromised passwords matching the obtained password, a criterion may be satisfied. Alternatively, in some embodiments, a number of the one or more compromised passwords that match the obtained password may be determined, and in response to a determination that the number of the one or more compromised passwords that match the obtained password exceeds a threshold, a criterion may be satisfied. The threshold may be one or more.

In some embodiments, the credential guardian 220 may determine whether one or more user accounts associated with a password is an active or inactive user account. Determining whether a user account is an active user account may include retrieving a previous time stamp of access of the user account and determining that the user account is an active user account when a time difference between the previous time stamp and a current time is less than a predetermined threshold. In response to a determination that one or more user accounts are inactive user accounts and the rest are active user accounts, the credential guardian 220 may retrieve credential data corresponding to user accounts that are determined to be active user accounts from the user account repository 224. An advantage of this would be a reduction of a use of computational resources in order to compare credential data. In other words, by identifying the inactive user accounts, the amount of data that is compared is less, thereby, reducing the computational resources needed to compare credential data. Based on identification of user accounts as active user accounts and inactive user accounts, the controller 222 may delete the inactive user accounts from the user account repository 224 in order to create more space in the repository 224 for new data.

In some embodiments, credential guardian 220 may determine whether a password includes repetitive characters. A criterion may be satisfied in response to the determination that the password includes repetitive characters. For instance, a password such as "aaa123" or "aaabbb" may be determined to include repetitive characters and accordingly, the credential guardian 220 may determine that the criterion for repetitive characters is satisfied with such passwords. Further, in some embodiments, credential guardian 220 may determine whether a password include sequential characters. A criterion may be satisfied in response to the determination that the password includes sequential characters. For instance, a password such as "abc8281" may be determined to include sequential characters (since the first three characters "abc" are sequential characters in the alphabet) and accordingly, the credential guardian 220 may determine that the criterion for sequential characters is satisfied with such a password.

In some embodiments, credential guardian 220 may determine whether a password includes one or more commonly used dictionary words. In other words, the credential guardian 220 may check for presence of dictionary words in the password. The check may compare the password to a repository of commonly used dictionary words that could be easy targets for hackers. For example, a password such as "password123," "thisispassword," or "yankees" may be an easy target for hackers. Accordingly, the credential guardian 220 may check for the presence of dictionary words (for example, the presence of commonly used dictionary words) in the password by comparing the password to a repository (for example, within the network accessible resource 214) of dictionary words in order to determine whether or not the password is acceptable for usage. Such a repository of dictionary words may include more than 10,000 entries, 100,000 entries, 1 million entries, 10 million entries, 100 million entries, or 1 billion entries. A criterion may be satisfied in response to the determination that the password includes one or more commonly used dictionary words.

In some embodiments, credential guardian 220 may determine whether a password includes one or more context-specific words. For instance, a password such as "Microsoft123" associated with a Microsoft user account may be determined to be context-specific because the password identifies the company name. Further, a password such as "gmail22" associated with a gmail user account may be determined to be context-specific because the password identifies the email address. Additionally, a password such as "johnsmith" associated with a username john.smith@xxx.com may be determined to be context-specific because the password identifies the username. In order to check whether the password includes context-specific words, the credential guardian 220 may retrieve other information associated with the password, for example, username, company name, domain name, etc. from a user account repository 224 or from information provided by a user associated with the password, and based on such other information, the credential guardian 220 may check to see whether a password includes context-specific words. A criterion may be satisfied in response to the determination that the password includes one or more context-specific words In some embodiments, credential guardian 220 may determine whether a password includes characters equal to or greater than a minimum number of characters and equal to or less than a maximum number of characters. For instance, the minimum number of characters may be 8, 10, 12, or any other number and the maximum number of characters may be 16, 32, 64, or any other number. The minimum number and maximum number of characters may be modified based on security needs. In response to determining that the password includes characters less than the minimum number of characters or greater than the maximum number of characters, a criterion may be satisfied. A password less than a minimum number of characters may be easy to guess by cyber criminals and a password that is greater than a maximum number of characters may be harder to remember for a user. Accordingly, creating a password greater than or equal a minimum number of characters and less than or equal to a maximum number of characters is recommended. It should be understood that all the operations described to be performed by credential guardian 220 in this portion of the disclosure may also be performed by the identify management system (for example, the credential-monitoring system 212 or the password management application within a computing device 232). For example, if the passwords that are transmitted to the credential monitoring system 212 are encrypted, then the credential-monitoring system 212 may perform password cracking in order to determine whether the obtained password (or a plurality of passwords) satisfies one or more criteria from among the above-discussed plurality of criteria. In some embodiments, the credential monitoring system 212 may use, for example, rainbow tables for cracking non-plaintext passwords. Rainbow tables are large sets of precomputed tables filled with hash values that are pre-matched to possible plaintext passwords. The rainbow tables may be stored in the miscellaneous database 136 or a repository in the credential monitoring system 212. In some embodiments, the credential monitoring system 212 may perform brute-force attacks (e.g., of iteratively guessing every possible combination of a password) or dictionary attacks (e.g., by loading a password cracking dictionary containing hundreds of thousands of commonly used passwords and see if it gets any hits) in order to crack the non-plaintext passwords.

In some embodiments, in response to a determination that a password satisfies one or more criteria from among the above-discussed plurality of criteria, the credential guardian 220 (or controller 222) may reject a use of the password to access the network accessible resource 214 and cause a user associated with the password to be notified to change the password. In some embodiments, in response to a determination that a password satisfies one or more criteria from among the above-discussed criteria, the credential guardian 220 (or controller 222) may block access to a user account associated with the password. The details regarding blocking access to a user account and notifying a user to change a password has been discussed in detail above, and therefore, for the sake of brevity, are not repeated. Alternatively, in response to a determination that a password does not satisfy one or more criteria from among the above-discussed criteria, the credential guardian 220 (or controller 222) may cause a user account on the network accessible resource 114 to be accessed using the password and, for example, a username corresponding to the password.

In addition to rejecting a password, notifying a user to change the password, or blocking access to a user account associated with the password, in some embodiments, in response to a determination that a password satisfies one or more criteria from among the above-discussed plurality of criteria, the credential guardian 220 (or controller 222) may recommend an alternative password similar to the password (i.e., the password that was rejected, notified to be changed, or blocked from being used to access a user account). For instance, a password such as "abc2898" may be determined to include sequential characters. Based on such a determination, the credential guardian may create a list of alternative passwords that are similar to the password "abc2898" and determine whether these alternative passwords satisfy one or more criteria from among a plurality of criteria including: (a) determining whether the alternative passwords match one or more passwords that have been known to be compromised, (b) determining whether the alternative passwords include repetitive or sequential characters, (c) determining whether the alternative passwords include dictionary words, (d) determining whether the alternative passwords include context-specific words, (e) determining whether the alternative passwords include characters less than a minimum number of characters or greater than a maximum number of characters, and (f) determining whether the password has greater than a threshold amount of entropy. In response to a determination that the one or more alternative passwords do not satisfy one or more criteria from among the plurality of criteria, the one or more alternative passwords may be presented and recommended as an alternative to the password that has been rejected. The alternative passwords that satisfy one or more criteria from among the plurality of criteria will not be presented or recommended to the user as an alternative to the password that has been rejected. This way, alternative passwords that do not pose a risk to the security of user accounts may be recommended and presented to a user for selection.

As described above, access to a user account associated with a password may be blocked, use of a password to create a new user account may be rejected, change of a previous password to a new password for an existing user account may be denied, or a user may be notified to change a password based on various different criteria. As noted above, the different criteria include: (a) determining whether a password matches one or more passwords that have been known to be compromised, (b) determining whether a password includes repetitive or sequential characters, (c) determining whether a password includes dictionary words, (d) determining whether a password includes context-specific words, (e) determining whether a password includes characters less than a minimum number of characters or greater than a maximum number of characters, and (f) determining whether the password has greater than a threshold amount of entropy. In some embodiments, a determination that a password satisfies one or more of these criteria may be sufficient to block access to a user account associated with such a password, deny use of such a password to create a new user account, deny change of a previous password to such a password for an existing user account, or notify a user to change such a password.

In some embodiments, it may be sufficient to satisfy one of the above-noted criteria to block access to a user account associated with such a password, deny use of such a password to create a new user account, deny change of a previous password to such a password for an existing user account, or notify a user to change such a password. Alternatively, in some embodiments, more than one (for example, at least two of the above-noted criteria, at least three of the above-noted criteria, etc.) may be sufficient to block access to a user account associated with such a password, deny use of such a password to create a new user account, deny change of a previous password to such a password for an existing user account, or notify a user to change such a password.

In some embodiments, satisfaction of the criteria that a password matches one or more passwords that have been known to be compromised may be sufficient to block access to a user account associated with such a password, deny use of such a password to create a new user account, deny change of a previous password to such a password for an existing user account, or notify a user to change such a password. In some embodiments, satisfaction of more than one of the above-noted criteria (b), (c), (d), (e), and (f) may be required to block access to a user account associated with such a password, deny use of such a password to create a new user account, deny change of a previous password to such a password for an existing user account, or notify a user to change such a password.

In some embodiments, in response to determining that none of the above-noted criteria are satisfied with respect to a password, the controller 222 may cause a user account on the network accessible resource 214 to be accessed using the password and a username associated with the password. In some embodiments, even if one or more of the above-noted criteria is satisfied with respect to a password, the controller 222 may still cause a user account on the network accessible resource 214 to be accessed using the password and a username associated with the password.

Further, in some embodiments, the other processes described above with regard to one or more components of FIGS. 1A and 1B also apply to this portion of the disclosure, and therefore, for the sake of brevity, are not repeated.

Figure 4:
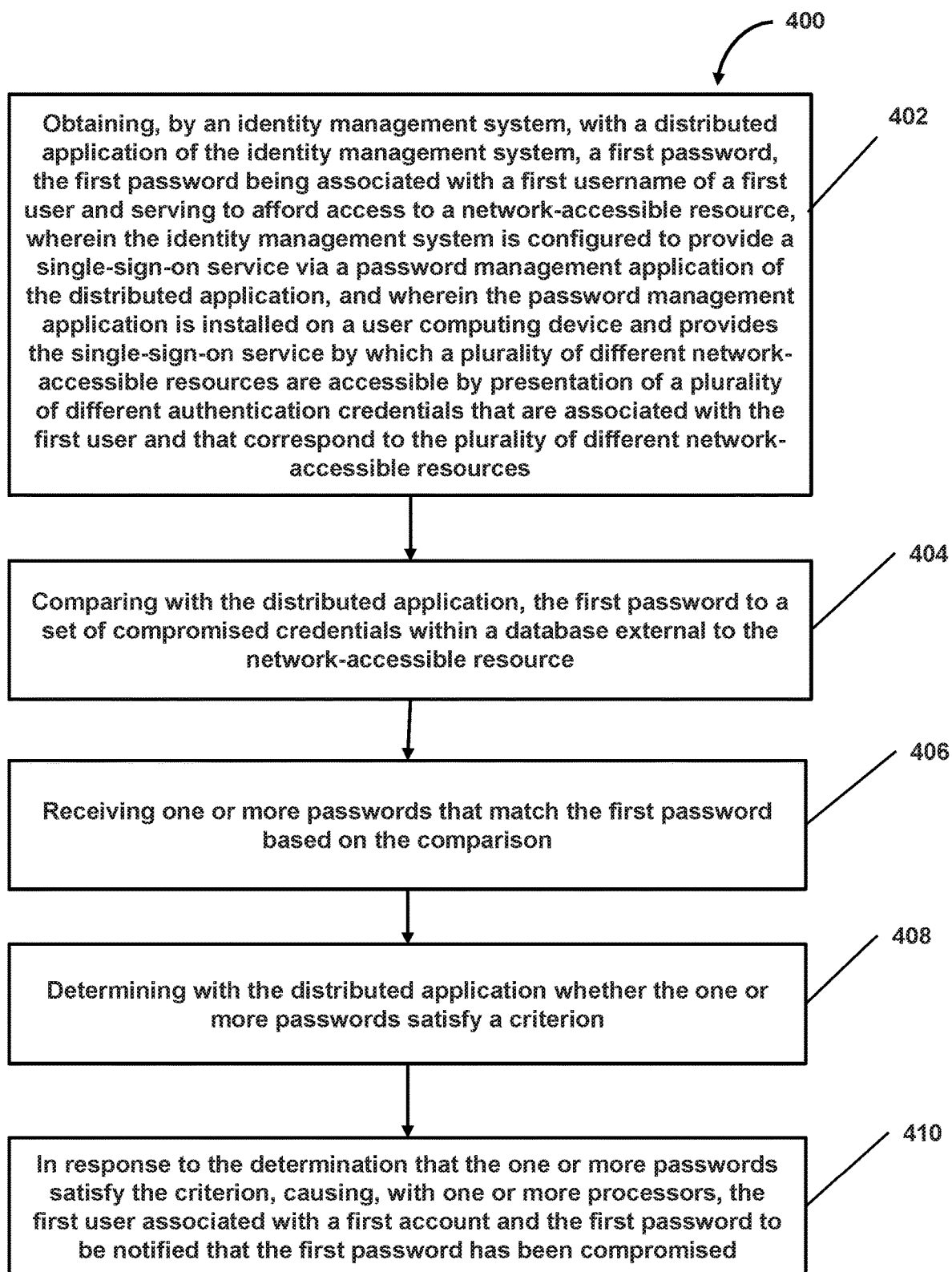
FIG. 4 is a flowchart of an example process that impedes account takeover by comparing credential data with compromised credential data stored external to a private computer network by an identity management system.

FIG. 4 illustrates an example process 400 that impedes account takeover by comparing credential data with compromised credential data stored external to a private computer network by an identity management system. In step 402, a first password may be obtained with a distributed application of an identity management system. The first password may be associated with a first username of a first user and serve to afford access to a network-accessible resource. The identify management system may provide a single-sign-on service via a password management application of the distributed application. The password management application may be installed on a user computing device and the password management application may provide a single-sign-on service by which a plurality of different network-accessible resources are accessible by presentation of a plurality of different authentication credentials that are associated with the first user and that correspond to the plurality of different network-accessible resources.

In step 404, the first password may be compared (with the distributed application) to a set of compromised credentials within a database external to the network-accessible resource. The first password may be transmitted to a remote credential monitoring system in order to perform the comparison of the first password and a set of compromised credentials. The transmitted first password may be transmitted in the form of a cryptographic hash of that credential for comparison with cryptographic hashes of compromised credentials using the same cryptographic hash function and salt, like SHA 256 or MD5 hashes, so that comparisons are performed without having access to the credentials outside the private computer network.

In step 406, based on the comparison, one or more passwords that match the first password may be received. In step 408, whether the one or more passwords satisfy a criterion may be determined with the distributed application. Determining whether the one or more passwords that match the first password satisfy a criterion may include determining whether a number of the one or more passwords that match the first password exceeds a threshold.

In step 410, in response to the determination that the one or more passwords (that match the first password) satisfy the criterion, the first user associated with a first account and the first password is notified that the first password has been compromised. Further, in response to the determination that the one or more passwords (that match the first password) satisfy the criterion, a user associated the first user account may be notified to change the first password associated with the first user account.

Figure 5:
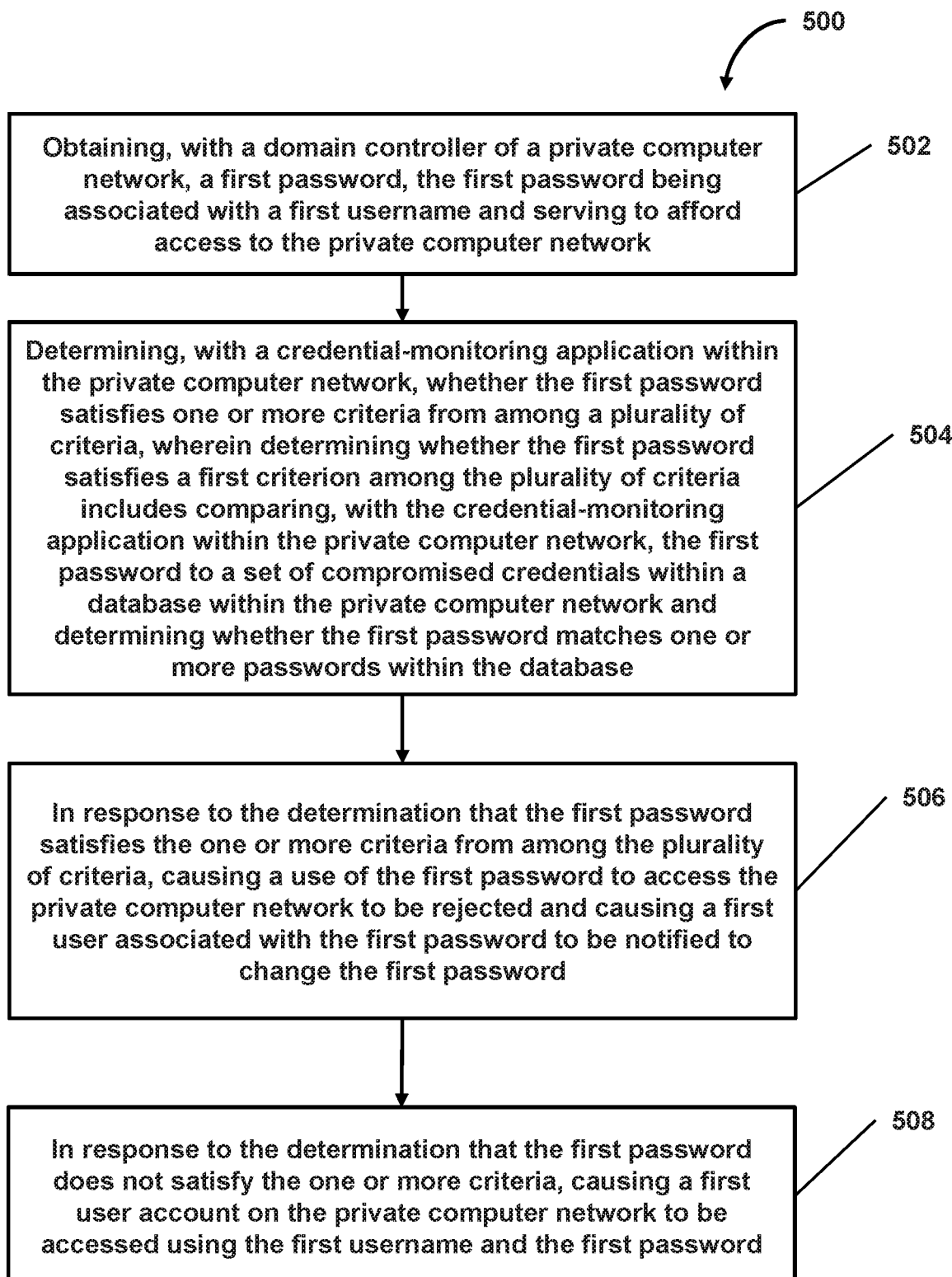
FIG. 5 is a flowchart of an example process of password filtering based on locally available data.

FIG. 5 illustrates an example process 500 of password filtering based on locally available data. In step 502, a first password may be obtained with a controller of a private computer network. The first password is associated with a first username and serving to afford access to the private computer network. The first password may be obtained in response to a user attempting to create the first password associated with a username, a user attempting to change a previous password associated with a username to the first password, or a user attempting login using the first password. Additionally, or alternatively, the first password may be obtained from a user account repository. In some embodiments, the first password may be obtained in response to an update to a compromised credential repository within the private computer network or an update to the user account repository.

In step 504, whether the first password satisfies one or more criteria from among a plurality of criteria may be determined with a credential-monitoring application within the private computer network. Determining whether the first password satisfies a first criterion among the plurality of criteria may include comparing, with the credential-monitoring application within the private computer network, the first password to a set of compromised credentials within a database within the private computer network and determining whether the first password matches one or more passwords within the database. The first criterion may be satisfied in response to the one or more passwords matching the first password. Alternatively, determining whether the first password satisfies a first criterion may further include determining whether a number of the one or more passwords that match the first password exceeds a predetermined threshold, and the first criterion may be satisfied in response to the determination that the number of the one or more passwords that match the first password exceeds the predetermined threshold.

In step 506, in response to the determination that the first password satisfies the one or more criteria from among the plurality of criteria, a use of the first password to access the private computer network may be rejected and a first user associated with the first password may be notified to change the first password. Further, in response to the determination that the first password satisfies the one or more criteria from among the plurality of criteria, access to a user account associated with the first password may be blocked. In step 508, in response to the determination that the first password does not satisfy the one or more criteria, a first user account on the private computer network may be accessed using the first username and the first password.

Figure 6:
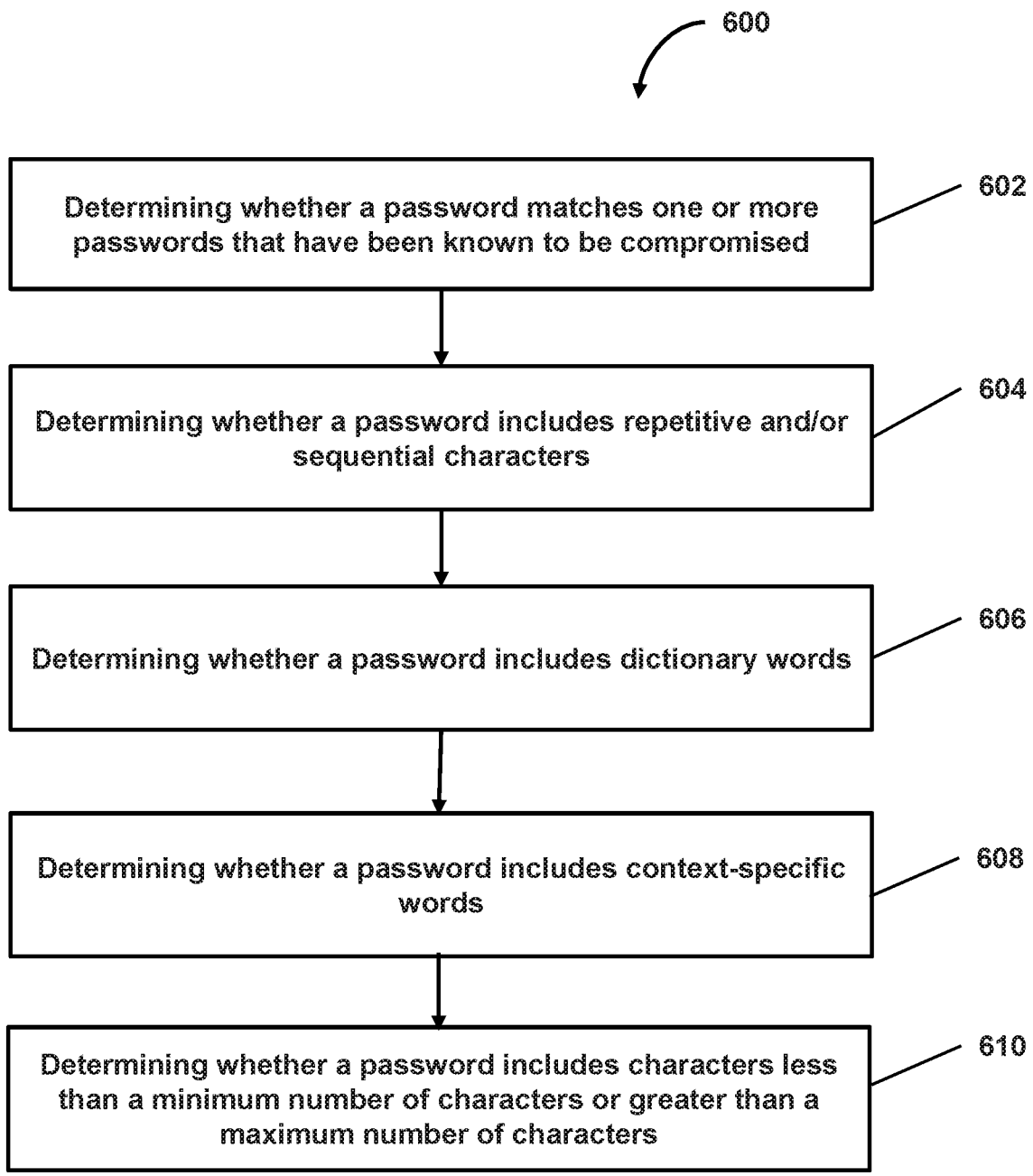
FIG. 6 is a flowchart of an example process to determine whether to reject a password or allow access to a user account using the password based on a plurality of criteria.

FIG. 6 illustrates an example process 600 to determine whether to reject a password or allow access to a user account using the password based on a plurality of criteria. In step 602, a password may be compared to a set of compromised credentials and a determination may be made as to whether the password matches one or more passwords that have been known to be compromised. In step 604, whether a password includes repetitive or sequential characters may be determined. For instance, a password such as "aaa123" or "aaabbb" may be determined to include repetitive characters and a password such as "abc8281" may be determined to include sequential characters (since the first three characters "abc" are sequential characters in the alphabet).

In step 606, whether a password includes dictionary words may be determined. In other words, a password may be checked for presence of dictionary words. The check may compare the password to a repository of commonly used dictionary words that could be easy targets for hackers. For example, a password such as "password123," "thisispassword," or "yankees" may be an easy target for hackers. In step 608, whether a password includes context-specific words may be determined. For instance, a password such as "Microsoft123" associated with a Microsoft user account may be determined to be context-specific because the password identifies the company name. Further, a password such as "gmail22" associated with a gmail user account may be determined to be context-specific because the password identifies the email address. Additionally, a password such as "johnsmith" associated with a username john.smith@xxx.com may be determined to be context-specific because the password identifies the username. In order to check whether the password includes context-specific words, other information (for example, username, company name, domain name, etc. from a user account repository 224 or from information provided by a user associated with the password) associated with the password may retrieved, and based on such other information, whether a password includes context-specific words may be determined.

In step 610, whether a password includes characters less than a minimum number of characters or greater than a maximum number of characters may be determined. For instance, the minimum number of characters may be 8, 10, 12, or any other number and the maximum number of characters may be 16, 32, 64, or any other number. A password less than a minimum number of characters may be easy to guess by cyber criminals and a password that is greater than a maximum number of characters may be harder to remember for a user. In response a determination that a password satisfies one or more criteria from among the above-discussed plurality of criteria, a use of the password to access a private network may be rejected and a user associated with the password may be notified to change the password. In response a determination that a password satisfies one or more criteria from among the above-discussed plurality of criteria, access to a user account associated with the password may be blocked. Alternatively, in response a determination that a password does not satisfy one or more criteria from among the above-discussed plurality of criteria, a user account on the private computer network may be allowed to be accessed using the password and, for example, a username corresponding to the password.

Figure 7:
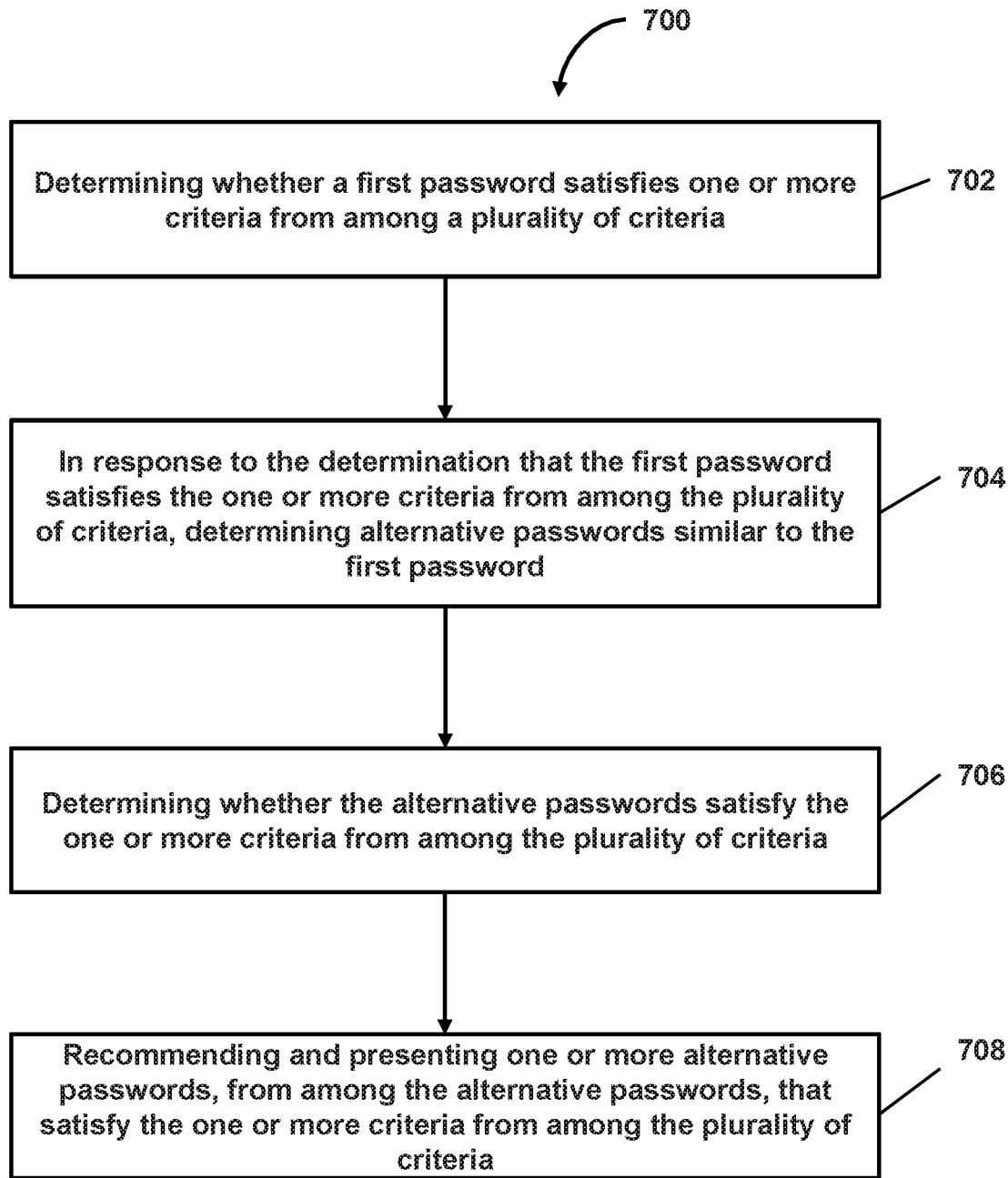
FIG. 7 is a flowchart of an example process that recommends and presents an alternative password.

FIG. 7 illustrates an example process 700 that recommends and presents an alternative password. In step 702, whether a first password satisfies one or more criteria from among a plurality of criteria may be determined. As noted above, the plurality of criteria may include: (a) determining whether the first password matches one or more passwords that have been known to be compromised, (b) determining whether the first password includes repetitive or sequential characters, (c) determining whether the first password includes dictionary words, (d) determining whether the first password includes context-specific words, (e) determining whether the first password includes characters less than a minimum number of characters or greater than a maximum number of characters, and (f) determining whether the first password has greater than a threshold amount of entropy. In step 704, in response to the determination that the first password satisfies the one or more criteria from among the plurality of criteria, alternative passwords similar to the first password may be determined.

In step 706, whether the alternative passwords satisfy the one or more criteria from among the plurality of criteria may be determined. In other words, whether the alternative passwords satisfy one or more of the following plurality of criteria may be determined: (a) determining whether the first password matches one or more passwords that have been known to be compromised, (b) determining whether the first password includes repetitive or sequential characters, (c) determining whether the first password includes dictionary words, (d) determining whether the first password includes context-specific words, (e) determining whether the first password includes characters less than a minimum number of characters or greater than a maximum number of characters, and (f) determining whether the first password has greater than a threshold amount of entropy. In step 708, one or more alternative passwords (form among the alternative passwords) that satisfy the one or more criteria from among the plurality of criteria may be recommended and presented to a user for selection. This way, alternative passwords that do not pose a risk to the security of user accounts may be recommended and presented to a user for selection.

Figure 8:
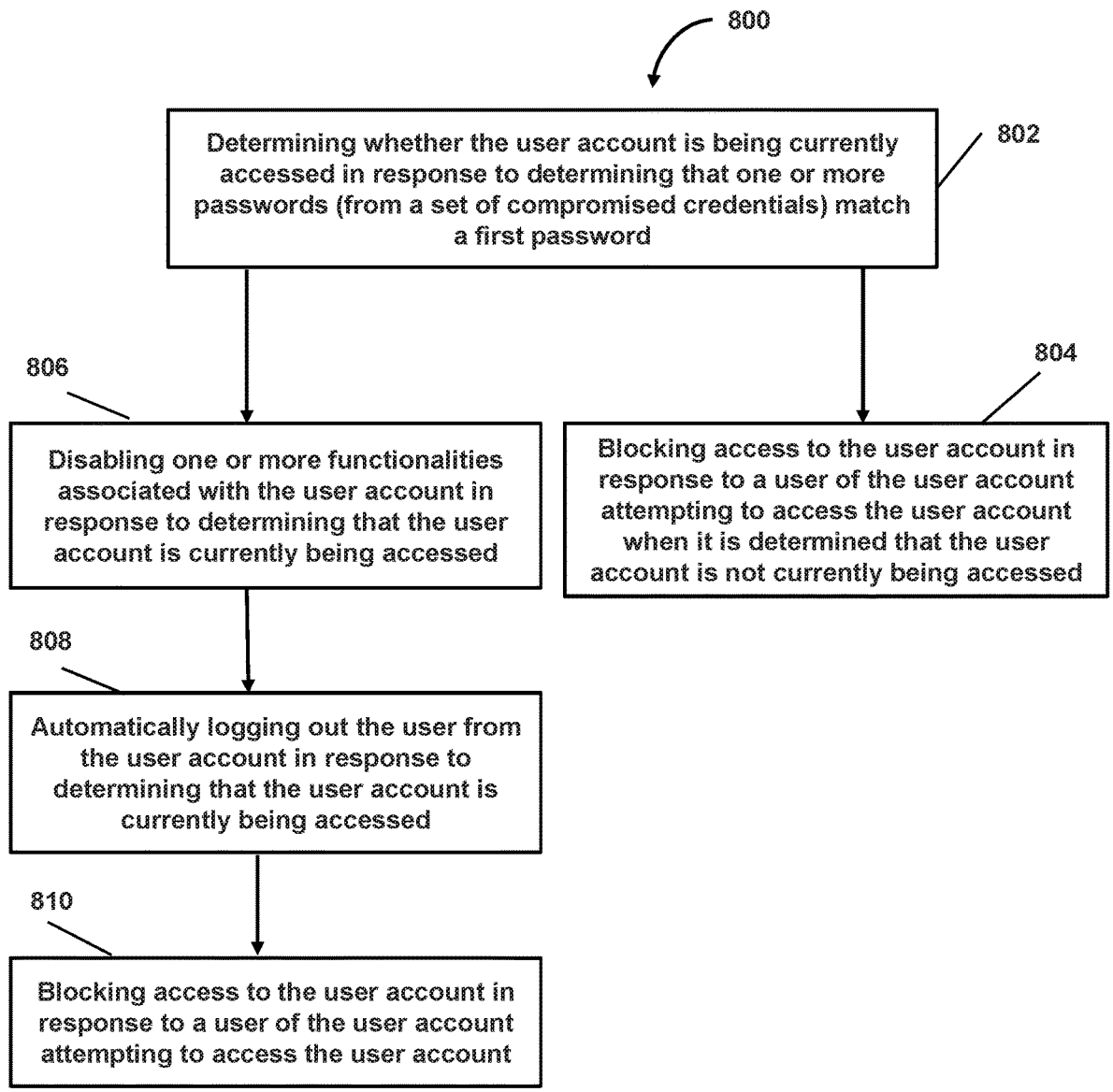
FIG. 8 is a flowchart of an example process that blocks access to a user account.

FIG. 8 illustrates an example process 800 that blocks access to a user account. In step 802, a determination may be made as to whether the user account is being currently accessed in response to determining that the one or more passwords (from a set of compromised credentials) match a first password. In response to determining that the user account is not currently being accessed, a user may be blocked from accessing the user account (associated with the first password) whenever the user of the user account attempts to access the user account in step 804. In some embodiments, in addition to blocking access to the user account when the user attempts to access the user account, the user of the user account may also be notified to change the first password associated with the user account when the user attempts to access the user account.

However, in response to determining that the user account is currently being accessed, one or more functionalities of the user account may be disabled in step 806. Disabling one or more functionalities of the user account may force the user of the user account to take immediate action in changing the password of the user account. Additionally, or alternatively, the user account may be forced to log out automatically in response to determining that the user account is currently being accessed in step 808. In some embodiments, the user of the user account may be automatically logged out from the user account after a certain period of time (for example, a certain period of time after it is determined that the one or more passwords match the first password) if the user has not changed the first password for the user account within the certain amount of time. In step 810, a user may be blocked from accessing the user account whenever the user of the user account attempts to access the user account.

Figure 9:
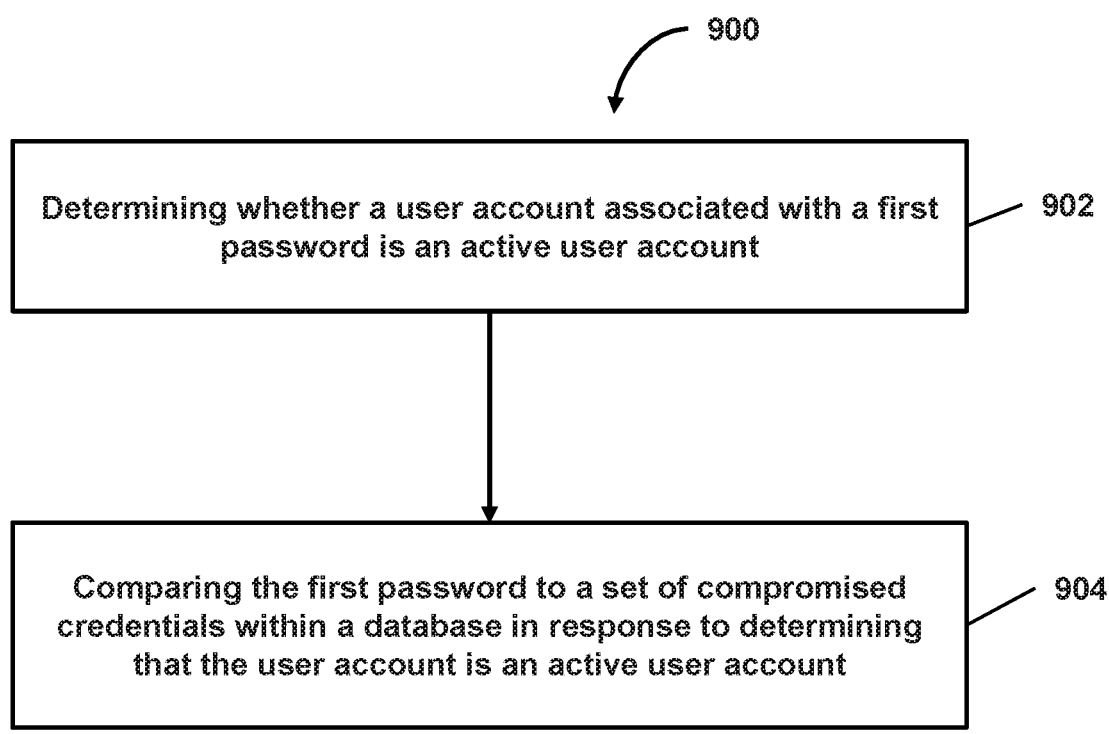
FIG. 9 is a flowchart of an example process that compares a password to a set of compromised credentials.

FIG. 9 illustrates an example process 900 that compares a password to a set of compromised credentials. In step 902, whether a user account associated with a first password is an active user account may be determined. Details regarding the techniques to determine whether the user account associated with the first password is an active user account is discussed above and below with regard to FIG. 10. In step 904, in response to determining that the user account is an active user account, the first password may be compared to a set of compromised credentials to determine a match between the first password and the set of compromised credentials. However, in response to determining that the user account is an inactive user account, no further action may be taken, thereby preserving communication and processing resources, in some embodiments.

Figure 10:
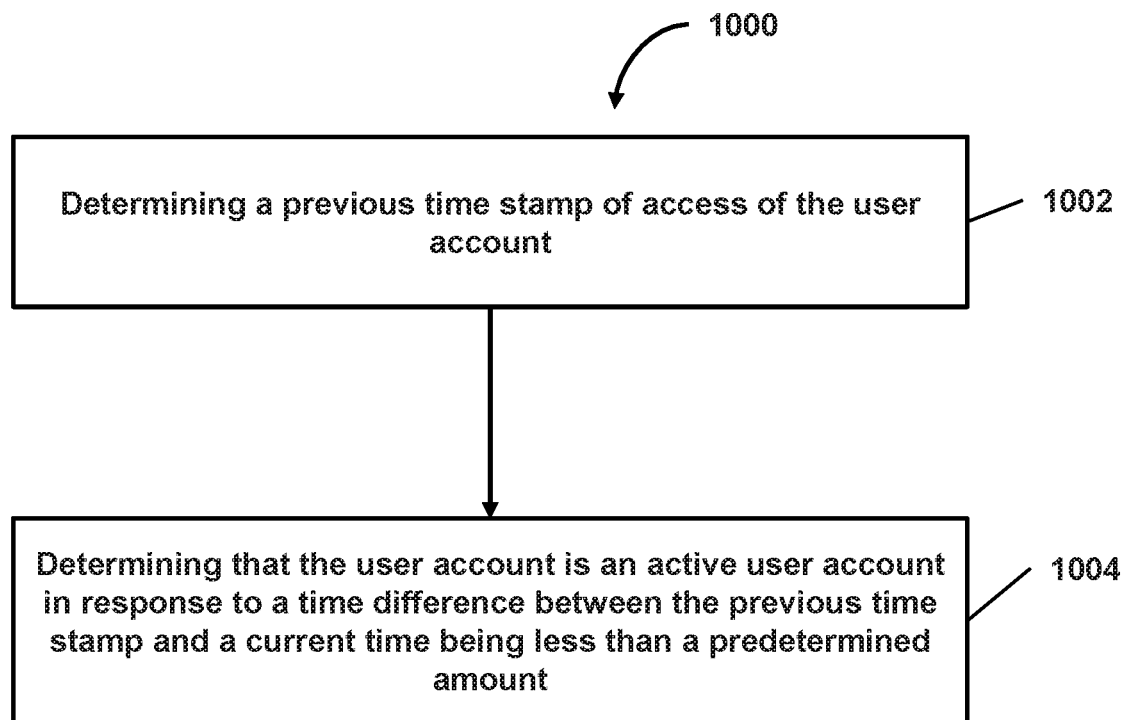
FIG. 10 is a flowchart of an example process that determines whether a user account associated with a password is an active user account.

FIG. 10 illustrates an example process 1000 that determines whether a user account associated with a password is an active user account. In step 1002, a previous (or latest) time stamp of access of the user account may be determined. In some embodiments, a time stamp of a previous (or latest) attempt to login to access a user account using the user credential may be stored in the user account repository and this time stamp may be obtained from the user account repository. In step 1004, the previous time stamp of access of the user account may be compared with a current time in order to determine whether the user account is an active user account. In response to a time difference between the previous time stamp and a current time being less than a predetermined amount, then in step 1004, it may be determined that the user account is an active user account. However, in response to a time difference between the previous time stamp and a current time being equal to or greater than a predetermined amount, it may be determined that the user account is an inactive user account.

Figure 11:
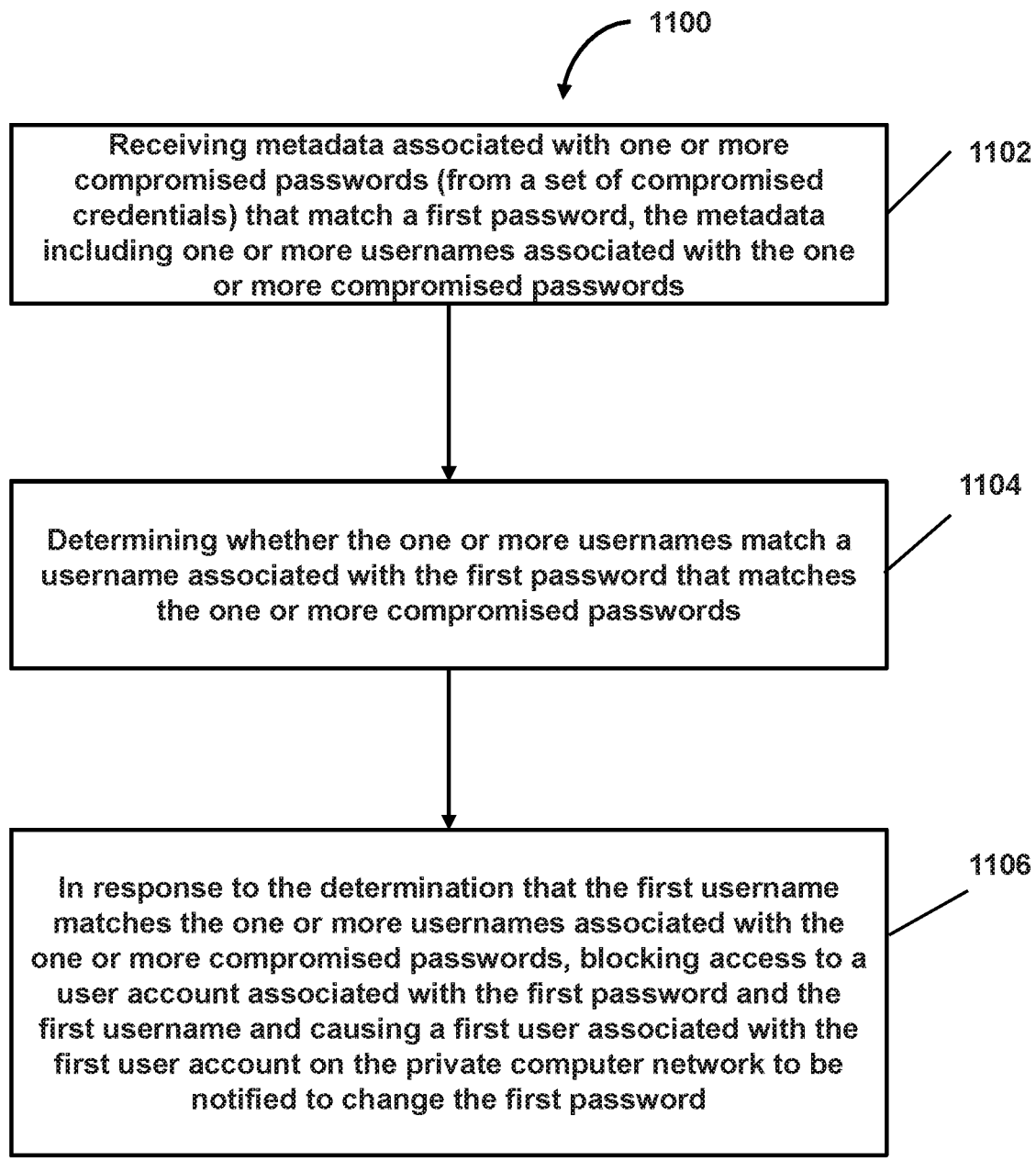
FIG. 11 is a flowchart of an example process that impedes account takeover by comparing usernames associated with one or more compromised passwords.

FIG. 11 illustrates an example process 1100 that impedes account takeover by comparing usernames associated with one or more compromised passwords. In step 1102, metadata associated with one or more compromised passwords (from a set of compromised credentials) that match a first password may be received. The metadata may include one or more usernames associated with the one or more compromised passwords. In step 1104, whether the one or more usernames match a username associated with the first password that matches the one or more compromised passwords may be determined. In response to the determination that the first username matches the one or more usernames associated with the one or more compromised passwords, in step 1106, access to a user account associated with the first password and the first username may be blocked and a first user associated with the first user account on the private computer network may be notified to change the first password.

Figure 12:
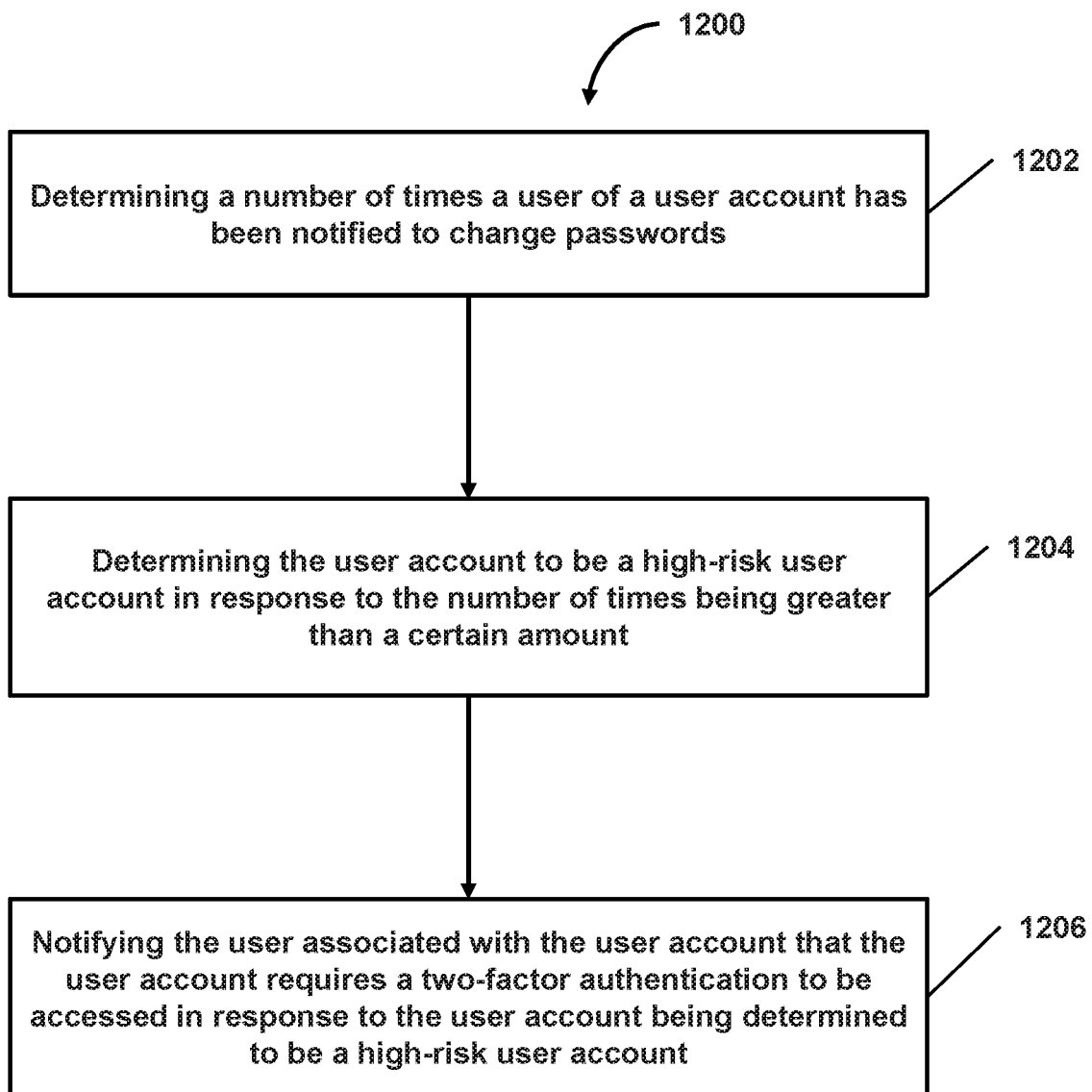
FIG. 12 is a flowchart of an example process that classifies a high-risk user account.

FIG. 12 illustrates an example process 1200 that classifies a high-risk user account. In step 1202, a number of times a user of a user account has been notified to change passwords may be determined. In step 1204, in response to the number of times being greater than a certain amount, the user account may be determined to be a high-risk user account (or the user may be determined to be a high-risk user). In step 1206 a user associated with the user account may be notified that the user account requires a two-factor authentication in response to the user account being determined to be a high-risk user account. That is, if the user account has been classified as a high-risk user account, then the user of the user account may be required to perform a two-factor authentication prior to being granted access to the user account. In some cases, the user of the user account may now need to provide a password and another form of authentication in order to be able to access the user account.

The present patent filing is one of a set of four filed on the same day by the same applicant and members of the set have the following titles: DETECTING USE OF COMPROMISED SECURITY CREDENTIALS IN PRIVATE ENTERPRISE NETWORKS; DETERMINING THE INTERSECTION OF A SET OF COMPROMISED CREDENTIALS WITH A SET OF ACTIVE CREDENTIALS WITH DATA STRUCTURES AND ARCHITECTURES THAT EXPEDITE COMPARISONS; FILTERING PASSWORDS BASED ON A PLURALITY OF CRITERIA; DETECTING USE OF PASSWORDS THAT APPEAR IN A REPOSITORY OF BREACHED CREDENTIALS. The entire content of each of the patent filings other than this one is hereby incorporated by reference.

Figure 13:
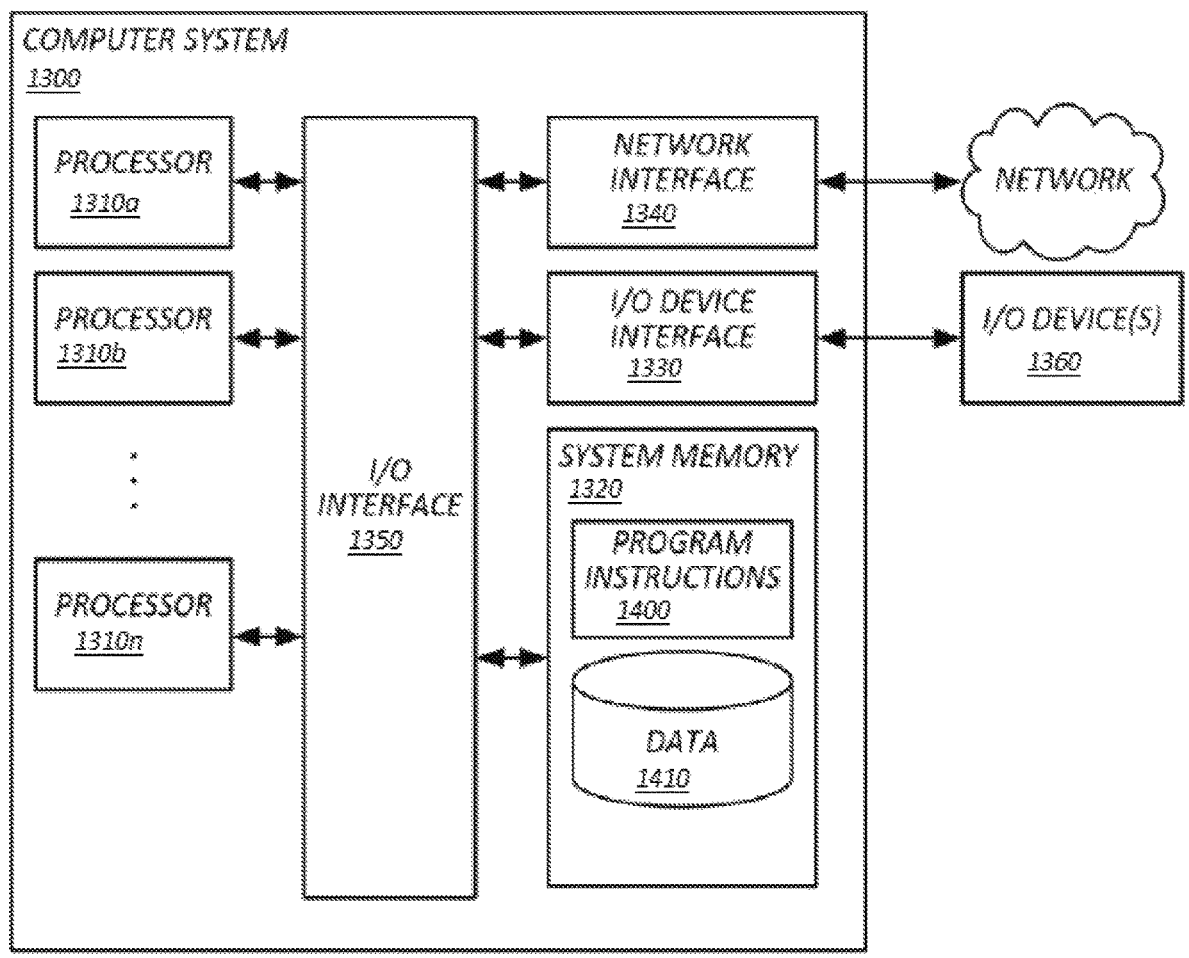
FIG. 13 is an example of a computing device by which the above techniques may be implemented.

FIG. 13 is a diagram that illustrates an exemplary computing device 1300 in accordance with embodiments of the present technique. Various portions of systems and methods described herein, may include or be executed on one or more computer systems similar to computing device 1300. Further, processes and modules described herein may be executed by one or more processing systems similar to that of computing device 1300.

Computing device 1300 may include one or more processors (e.g., processors 1310a-1310n) coupled to system memory 1320, an input/output I/O device interface 1330, and a network interface 1340 via an input/output (I/O) interface 1350. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing device 1300. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1320). Computing device 1300 may be a uni-processor system including one processor (e.g., processor 1310a), or a multi-processor system including any number of suitable processors (e.g., 1310a-1310n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing device 1300 may include a plurality of computing devices (e.g., distributed computer systems) to implement various processing functions.

I/O device interface 1330 may provide an interface for connection of one or more I/O devices 1360 to computing device 1300. I/O devices may include devices that receive input (e.g., from a user) or output information (e.g., to a user). I/O devices 1360 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1360 may be connected to computing device 1300 through a wired or wireless connection. I/O devices 1360 may be connected to computing device 1300 from a remote location. I/O devices 1360 located on remote computer system, for example, may be connected to computing device 1300 via a network and network interface 1340.

Network interface 1340 may include a network adapter that provides for connection of computing device 1300 to a network. Network interface 1340 may facilitate data exchange between computing device 1300 and other devices connected to the network. Network interface 1340 may support wired or wireless communication. The network may include an electronic communication network, such as the Internet, a local area network (LAN), a wide area network (WAN), a cellular communications network, or the like.

System memory 1320 may be configured to store program instructions 1400 or data 1410. Program instructions 1400 may be executable by a processor (e.g., one or more of processors 1310a-1310n) to implement one or more embodiments of the present techniques. Instructions 1400 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1320 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1320 may include a non-transitory computer readable storage medium that may have program instructions stored thereon that are executable by a computer processor (e.g., one or more of processors 1310a-1310n) to cause the subject matter and the functional operations described herein. A memory (e.g., system memory

1320) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1350 may be configured to coordinate I/O traffic between processors 1310a-1310n, system memory 1320, network interface 1340, I/O devices 1360, and/or other peripheral devices. I/O interface 1350 may perform protocol, timing, or other data transformations to convert data signals from one component (e.g., system memory 1320) into a format suitable for use by another component (e.g., processors 1310a-1310n). I/O interface 1350 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing device 1300 or multiple computing device 1300 configured to host different portions or instances of embodiments. Multiple computing devices 1300 may provide for parallel or sequential processing/execution of one or more portions of the techniques described herein.

Those skilled in the art will appreciate that computing device 1300 is merely illustrative and is not intended to limit the scope of the techniques described herein. Computing device 1300 may include any combination of devices or software that may perform or otherwise provide for the performance of the techniques described herein. For example, computing device 1300 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing device 1300 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing device 1300 may be transmitted to computing device 1300 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with one or more processors, with an identity management system, a first password, the first password being associated with a first username of a first user and serving to afford access to a network-accessible resource, wherein the identity management system is a distributed application configured to provide a single-sign-on service via a password management application of the distributed application, and wherein the password management application is installed on a user computing device and provides the single-sign-on service by which a plurality of different network-accessible resources are accessible by presentation of a plurality of different authentication credentials that are associated with the first user and that correspond to the plurality of different network-accessible resources; comparing, with one or more processors, with the distributed application, the first password to a set of compromised credentials within a database external to the network-accessible resource; receiving, with one or more processors, one or more passwords that match the first password based on the comparison; determining, with one or more processors, with the distributed application whether the one or more passwords satisfy a criterion; and in response to the determination that the one or more passwords satisfy the criterion, causing, with one or more processors, the first user associated with a first account and the first password to be notified that the first password has been compromised.

2. The medium of embodiment 1, wherein the distributed application comprises: a remote credential-monitoring application external to the network-accessible resource; and the password management application within the user computing device; the remote credential-monitoring application is configured expose an application program interface by which the first password is obtained from the password management application and to determine that the one or more passwords satisfy the criterion; and the password management application is configured to, in response to the determination that the one or more passwords satisfy the criterion, cause the first user to be notified that the first password has been compromised and cause a controller of the network-accessible resource to be notified that the first password has been compromised.

3. The medium of any one of embodiments 1-2, wherein the first password is obtained via the password management application and in response to the first user inputting the first password via the password management application.

4. The medium of any one of embodiments 1-3, wherein comparing, with the distributed application, the first password to the set of compromised credentials comprises: comparing the first password to the set of compromised credentials at a scheduled time responsive to a scheduled batch process by which an intersection of a first set and a second set of passwords is determined, the first set comprising more than 100 million compromised passwords and the second set comprising more than 1 million passwords that afford access to the network-accessible resource.

5. The medium of any one of embodiments 1-4, wherein comparing, with the distributed application, the first password to the set of compromised credentials comprises: comparing the first password to the set of compromised credentials responsive to the first user attempting to create the first password associated with the first username via the password management application, the first user attempting to change a previous password associated with the first username to the first password via the password management application, or responsive to a scheduled batch process.

6. The medium of any one of embodiments 1-5, wherein the operations comprise: in response to the determination that the one or more passwords satisfy the criterion, causing, with one or more processors, the first user associated with the first user account to be notified to change the first password.

7. The medium of any one of embodiments 1-6, wherein determining whether the one or more passwords satisfy the criterion includes determining whether a number of the one or more passwords exceeds a threshold, and the operations comprise: in response to the determination that the number of the one or more passwords exceeds the threshold, causing, with one or more processors, a controller of the network-accessible resource to be notified regarding the determination that the number of the one or more passwords exceeds the threshold and instructing, with one or more processors, the controller to block access to the first user account associated with the first password and the first username.

8. The medium of any one of embodiments 1-7, wherein the operations comprise: determining, with one or more processors, with the distributed application, whether the first password satisfies one or more criteria from among a plurality of criteria, wherein determining whether the first password satisfies a first criterion among the plurality of criteria includes determining whether the first password includes sequential characters and wherein the first criterion is satisfied in response to the determination that the first password includes sequential characters; and in response to the determination that the first password satisfies the first criterion, causing, with one or more processors, the first user associated with the first account and the first password to be notified to change the first password.

9. The medium of any one of embodiments 1-8, wherein the operations comprise: determining, with one or more processors, with the distributed application, whether the first password satisfies one or more criteria from among a plurality of criteria, wherein determining whether the first password satisfies a first criterion among the plurality of criteria includes determining whether the first password includes repetitive characters and wherein the first criterion is satisfied in response to the determination that the first password includes repetitive characters; and in response to the determination that the first password satisfies the first criterion, causing, with one or more processors, the first user associated with the first account and the first password to be notified to change the first password.

10. The medium of any one of embodiments 1-9, wherein the database is continuously updated with additional compromised credentials, and the operations comprise: generating a second criterion for the comparison, the criterion being generated at least based on whether another comparison identifying the first password has been previously made; and receiving, from the database, the one or more passwords that match the first password based on the comparison and the second criterion for the comparison.

11. The medium of embodiment 10, wherein receiving the one or more passwords that match the first password based on the comparison and the second criterion for the comparison comprises: receiving, from a subset of the database, the one or more passwords that match the first password in response to determining that the other comparison identifying the first password has been previously made.

12. The medium of any one of embodiments 1-11, wherein the first password is compared to the set of compromised credentials responsive to an update to the database.

13. The medium of any one of embodiments 1-12, wherein the operations comprise: selecting, from a second database external to the network-accessible resource, a subset of passwords added to the second database of since a previous batch process by which compromised credentials are compared to credentials; and determining an intersection of credentials in the database with the subset of passwords.

14. The medium of any one of embodiments 1-13, wherein the operations comprise: receiving metadata associated with the one or more passwords, the metadata including one or more usernames associated with the one or more passwords; determining whether the one or more usernames match the first username; and in response to the determination that the first username matches the one or more usernames, causing, with one or more processors, a controller of the network-accessible resource to be notified that the first username and first password have been compromised, instructing, with one or more processors, the controller of the network-accessible resource to block access to the first user account associated with the first password and the first username, and causing, with one or more processors, the first user associated with the first user account on the network-accessible resource to be notified to change the first password.

15. The medium of any one of embodiments 1-14, wherein: the match is determined based on a cryptographic hash collision.

16. The medium of any one of embodiments 1-5, wherein the operations comprise: notifying the first user via the password management application to change the first password.

7. The medium of any one of embodiments 1-15, wherein the set of compromised credentials comprise more than 100 million compromised credentials; and determining that a second password does not appear in the set of compromised credentials is performed within 5 seconds of obtaining the second password.

18. The medium of embodiment 17, wherein the second password is determined to not appear in the set of compromised credentials based on a probabilistic data structure or a content-addressable data structure to which data describing the set of compromised credentials is written.

19. The medium of any one of embodiments 1-18, wherein the operations comprise: determining, with one or more processors, with the distributed application, whether the first password satisfies one or more criteria from among a plurality of criteria, wherein determining whether the first password satisfies a first criterion among the plurality of criteria includes determining whether the first password includes one or more context-specific words and wherein the first criterion is satisfied in response to the determination that the first password includes one or more context-specific words; and in response to the determination that the first password satisfies the first criterion, causing, with one or more processors, the first user associated with the first account and the first password to be notified to change the first password.

20. A tangible, non-transitory, machine-readable medium storing instructions that when executed by a data processing apparatus cause the data processing apparatus to perform operations comprising: the operations of any one of embodiments 1-19.

21. A system, comprising: one or more processors; and memory storing instructions that when executed by the processors cause the processors to effectuate operations comprising: the operations of any one of embodiments 1-19.

What is claimed is:

1. A tangible, non-transitory, machine-readable medium storing instructions that when executed by one or more processors of an identity management system comprising a distributed application, the instructions effectuate operations comprising:
    obtaining, by a password management application of the distributed application installed on a user computing device, a first password, the first password being associated with a first username of a first user account and serving to afford a first user access to a network-accessible resource;
    providing, by the password management application, a single-sign-on service by which a plurality of different network-accessible resources are accessible by presentation of a plurality of different authentication credentials that are associated with the first user and that correspond to the plurality of different network-accessible resources;
    comparing, with the distributed application, the first password to a set of compromised credentials within a first database external to the network-accessible resource, wherein the first database is continuously updated with additional compromised credentials and the comparison comprises a batch process for:
        selecting, with the one or more processors, from a second database of the plurality of different authentication credentials associated with the first user, a subset of passwords added to the second database since a previous batch process; and
        determining, with the one or more processors, one or more passwords representing an intersection of the set of compromised credentials with the selected subset of passwords;
    receiving, with the distributed application, the one or more passwords that match the first password based on the comparison;
    determining, with the distributed application, whether the one or more passwords satisfy a criterion of the first password; and
    in response to the determination that the one or more passwords satisfy the criterion, causing, with the one or more processors, the first user associated with the first account and the first password to be notified that the first password has been compromised.

2. The medium of claim 1, wherein
the distributed application comprises:
    a remote credential-monitoring application external to the network-accessible resource; and
    the password management application within the user computing device;
the remote credential-monitoring application is configured to expose an application program interface by which the first password is obtained from the password management application and to determine that the one or more passwords satisfy the criterion; and
the password management application is configured to, in response to the determination that the one or more passwords satisfy the criterion, cause the first user to be notified that the first password has been compromised and cause a controller of the network-accessible resource to be notified that the first password has been compromised.

3. The medium of claim 1, wherein the first password is obtained via the password management application and in response to the first user inputting the first password via the password management application.

4. The medium of claim 1, wherein comparing, with the distributed application, the first password to the set of compromised credentials comprises:
    comparing the first password to the set of compromised credentials at a scheduled time responsive to a scheduled batch process by which an intersection of a first set and a second set of passwords is determined, the first set comprising more than 100 million compromised passwords and the second set comprising more than 1 million passwords that afford access to the network-accessible resource.

5. The medium of claim 1, wherein comparing, with the distributed application, the first password to the set of compromised credentials comprises:
    comparing the first password to the set of compromised credentials responsive to the first user attempting to create the first password associated with the first username via the password management application, the first user attempting to change a previous password associated with the first username to the first password via the password management application, or responsive to a scheduled batch process.

6. The medium of claim 1, wherein the operations comprise:
    in response to the determination that the one or more passwords satisfy the criterion, causing, with the one or more processors, the first user associated with the first user account to be notified to change the first password.

7. The medium of claim 1, wherein determining whether the one or more passwords satisfy the criterion includes determining whether a number of the one or more passwords exceeds a threshold, and the operations comprise:
    in response to the determination that the number of the one or more passwords exceeds the threshold, causing, with the one or more processors, a controller of the network-accessible resource to be notified regarding the determination that the number of the one or more passwords exceeds the threshold and instructing, with the one or more processors, the controller to block access to the first user account associated with the first password and the first username.

8. The medium of claim 1, wherein the operations comprise:
determining, with the one or more processors, with the distributed application, whether the first password satisfies one or more criteria from among a plurality of criteria, wherein determining whether the first password satisfies a first criterion among the plurality of criteria includes determining whether the first password includes sequential characters and wherein the first criterion is satisfied in response to the determination that the first password includes sequential characters; and
in response to the determination that the first password satisfies the first criterion, causing, with the one or more processors, the first user associated with the first account and the first password to be notified to change the first password.

9. The medium of claim 1, wherein the operations comprise:
determining, with the one or more processors, with the distributed application, whether the first password satisfies one or more criteria from among a plurality of criteria, wherein determining whether the first password satisfies a first criterion among the plurality of criteria includes determining whether the first password includes repetitive characters and wherein the first criterion is satisfied in response to the determination that the first password includes repetitive characters; and
in response to the determination that the first password satisfies the first criterion, causing, with the one or more processors, the first user associated with the first account and the first password to be notified to change the first password.

10. The medium of claim 1, wherein the first database is continuously updated with additional compromised credentials, and the operations comprise:
generating a second criterion for the comparison, the criterion being generated at least based on whether another comparison identifying the first password has been previously made; and
receiving, from the first database, the one or more passwords that match the first password based on the comparison and the second criterion for the comparison.

11. The medium of claim 10, wherein receiving the one or more passwords that match the first password based on the comparison and the second criterion for the comparison comprises:
receiving, from a subset of the first database, the one or more passwords that match the first password in response to determining that the other comparison identifying the first password has been previously made.

12. The medium of claim 1, wherein the first password is compared to the set of compromised credentials responsive to an update to the first database.

13. The medium of claim 1, wherein the operations comprise:

receiving metadata associated with the one or more passwords, the metadata including one or more usernames associated with the one or more passwords;
determining whether the one or more usernames match the first username; and
in response to the determination that the first username matches the one or more usernames, causing, with the one or more processors, a controller of the network-accessible resource to be notified that the first username and the first password have been compromised, instructing, with the one or more processors, the controller of the network-accessible resource to block access to the first user account associated with the first password and the first username, and causing, with the one or more processors, the first user associated with the first user account on the network-accessible resource to be notified to change the first password.

14. The medium of claim 1, wherein:
the match is determined based on a cryptographic hash collision.

15. The medium of claim 1, wherein the operations comprise:
notifying the first user via the password management application to change the first password.

16. The medium of claim 1, wherein
the set of compromised credentials comprise more than 100 million compromised credentials; and
determining that a second password does not appear in the set of compromised credentials is performed within 5 seconds of obtaining the second password.

17. The medium of claim 16, wherein
the second password is determined to not appear in the set of compromised credentials based on a probabilistic data structure or a content-addressable data structure to which data describing the set of compromised credentials is written.

18. The medium of claim 1, wherein the operations comprise:
determining, with the one or more processors, with the distributed application, whether the first password satisfies one or more criteria from among a plurality of criteria, wherein determining whether the first password satisfies a first criterion among the plurality of criteria includes determining whether the first password includes one or more context-specific words and wherein the first criterion is satisfied in response to the determination that the first password includes one or more context-specific words; and
in response to the determination that the first password satisfies the first criterion, causing, with the one or more processors, the first user associated with the first account and the first password to be notified to change the first password.

19. A method, comprising:
obtaining, with one or more processors and by a password management application of a distributed application installed on a user computing device, a first password, the first password being associated with a first username of a first user account and serving to afford a first user access to a network-accessible resource;
providing, by the password management application, a single-sign-on service by which a plurality of different network-accessible resources are accessible by presentation of a plurality of different authentication credentials that are associated with the first user and that correspond to the plurality of different network-accessible resources;

comparing, with the distributed application, the first password to a set of compromised credentials within a first database external to the network-accessible resource, wherein the first database is continuously updated with additional compromised credentials and the comparison comprises a batch process for:
  selecting, with the one or more processors, from a second database of the plurality of different authentication credentials associated with the first user, a subset of passwords added to the second database since a previous batch process; and
  determining, with the one or more processors, one or more passwords representing an intersection of the set of compromised credentials with the selected subset of passwords;
receiving, with the distributed application, the one or more passwords that match the first password based on the comparison;
determining, with the distributed application whether the one or more passwords satisfy a criterion of the first password; and
in response to the determination that the one or more passwords satisfy the criterion, causing, with the one or more processors, the first user associated with a first account and the first password to be notified that the first password has been compromised.

20. The method of claim 19, wherein
the distributed application comprises:
  a remote credential-monitoring application external to the network-accessible resource; and
  the password management application within the user computing device;
the remote credential-monitoring application is configured to expose an application program interface by which the first password is obtained from the password management application and to determine that the one or more passwords satisfy the criterion; and
the password management application is configured to, in response to the determination that the one or more passwords satisfy the criterion, cause the first user to be notified that the first password has been compromised and cause a controller of the network-accessible resource to be notified that the first password has been compromised.

21. The method of claim 19, wherein the first password is obtained via the password management application and in response to the first user inputting the first password via the password management application.

22. The method of claim 19, wherein comparing, with the distributed application, the first password to the set of compromised credentials comprises:
  comparing the first password to the set of compromised credentials at a scheduled time responsive to a scheduled batch process by which an intersection of a first set and a second set of passwords is determined, the first set comprising more than 100 million compromised passwords and the second set comprising more than 1 million passwords that afford access to the network-accessible resource.

23. The method of claim 19, wherein comparing, with the distributed application, the first password to the set of compromised credentials comprises:
  comparing the first password to the set of compromised credentials responsive to the first user attempting to create the first password associated with the first username via the password management application, the first user attempting to change a previous password associated with the first username to the first password via the password management application, or responsive to a scheduled batch process.

24. The method of claim 19, further comprising:
in response to the determination that the one or more passwords satisfy the criterion, causing, with the one or more processors, the first user associated with the first user account to be notified to change the first password.

25. The method of claim 19, wherein determining whether the one or more passwords satisfy the criterion includes determining whether a number of the one or more passwords exceeds a threshold, and the method further comprises:
  in response to the determination that the number of the one or more passwords exceeds the threshold, causing, with the one or more processors, a controller of the network-accessible resource to be notified regarding the determination that the number of the one or more passwords exceeds the threshold and instructing, with the one or more processors, the controller to block access to the first user account associated with the first password and the first username.

26. The method of claim 19, further comprising:
determining, with the one or more processors, with the distributed application, whether the first password satisfies one or more criteria from among a plurality of criteria, wherein determining whether the first password satisfies a first criterion among the plurality of criteria includes determining whether the first password includes sequential characters and wherein the first criterion is satisfied in response to the determination that the first password includes sequential characters; and
in response to the determination that the first password satisfies the first criterion, causing, with the one or more processors, the first user associated with the first account and the first password to be notified to change the first password.

27. The method of claim 19, further comprising:
determining, with the one or more processors, with the distributed application, whether the first password satisfies one or more criteria from among a plurality of criteria, wherein determining whether the first password satisfies a first criterion among the plurality of criteria includes determining whether the first password includes repetitive characters and wherein the first criterion is satisfied in response to the determination that the first password includes repetitive characters; and
in response to the determination that the first password satisfies the first criterion, causing, with the one or more processors, the first user associated with the first account and the first password to be notified to change the first password.

28. The method of claim 19, wherein the first database is continuously updated with additional compromised credentials, and the method further comprises:
  generating a second criterion for the comparison, the criterion being generated at least based on whether another comparison identifying the first password has been previously made; and
  receiving, from the first database, the one or more passwords that match the first password based on the comparison and the second criterion for the comparison.

29. The method of claim 28, wherein receiving the one or more passwords that match the first password based on the comparison and the second criterion for the comparison comprises:
receiving, from a subset of the first database, the one or more passwords that match the first password in response to determining that the other comparison identifying the first password has been previously made.

30. The method of claim 19, wherein the first password is compared to the set of compromised credentials
responsive to an update to the first database.

31. The method of claim 19, further comprising:
receiving metadata associated with the one or more passwords, the metadata including one or more usernames associated with the one or more passwords;
determining whether the one or more usernames match the first username; and
in response to the determination that the first username matches the one or more usernames, causing, with the one or more processors, a controller of the network-accessible resource to be notified that the first username and the first password have been compromised, instructing, with the one or more processors, the controller of the network-accessible resource to block access to the first user account associated with the first password and the first username, and causing, with the one or more processors, the first user associated with the first user account on the network-accessible resource to be notified to change the first password.

32. The method of claim 19, wherein:
the match is determined based on a cryptographic hash collision.

33. The method of claim 19, further comprising: notifying the first user via the password management application to change the first password.

34. The method of claim 19, wherein
the set of compromised credentials comprise more than 100 million compromised credentials; and
determining that a second password does not appear in the set of compromised credentials is performed within 5 seconds of obtaining the second password.

35. The method of claim 34, wherein
the second password is determined to not appear in the set of compromised credentials based on a probabilistic data structure or a content-addressable data structure to which data describing the set of compromised credentials is written.

36. The method of claim 19, further comprising:
determining, with the one or more processors, with the distributed application, whether the first password satisfies one or more criteria from among a plurality of criteria, wherein determining whether the first password satisfies a first criterion among the plurality of criteria includes determining whether the first password includes one or more context-specific words and wherein the first criterion is satisfied in response to the determination that the first password includes one or more context-specific words; and
in response to the determination that the first password satisfies the first criterion, causing, with the one or more processors, the first user associated with the first account and the first password to be notified to change the first password.

* * * * *